United States Patent
Dutu et al.

(10) Patent No.: US 12,131,026 B2
(45) Date of Patent: Oct. 29, 2024

(54) ADAPTIVE SCHEDULING OF MEMORY AND PROCESSING-IN-MEMORY REQUESTS

(71) Applicant: Advanced Micro Devices, Inc., Santa Clara, CA (US)

(72) Inventors: Alexandru Dutu, Kirkland, WA (US); Nuwan S Jayasena, Cupertino, CA (US); Niti Madan, Bee Cave, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 88 days.

(21) Appl. No.: 18/090,916

(22) Filed: Dec. 29, 2022

(65) Prior Publication Data

US 2024/0220107 A1 Jul. 4, 2024

(51) Int. Cl.
*G06F 3/06* (2006.01)

(52) U.S. Cl.
CPC ............ *G06F 3/061* (2013.01); *G06F 3/0659* (2013.01); *G06F 3/0673* (2013.01)

(58) Field of Classification Search
CPC ....... G06F 3/061; G06F 3/0659; G06F 3/0673
See application file for complete search history.

(56) References Cited

U.S. PATENT DOCUMENTS

| 5,101,485 | A | 3/1992 | Perazzoli, Jr. |
| 6,694,400 | B1 | 2/2004 | Lai et al. |
| 9,836,232 | B1 | 12/2017 | Vasquez et al. |
| 9,892,803 | B2 | 2/2018 | Reed |

(Continued)

FOREIGN PATENT DOCUMENTS

WO 2024072862 A1 4/2024

OTHER PUBLICATIONS

Aga, Shaizeen, et al., "Co-ML: a Case for Collaborative ML Acceleration using Near-data Processing", Proceedings of the International Symposium on Memory Systems [retrieved May 27, 2022]. Retrieved from the Internet <https://doi.org/10.1145/3357526.3357532>, Sep. 30, 2019, 12 pages.

(Continued)

*Primary Examiner* — Sean D Rossiter
(74) *Attorney, Agent, or Firm* — FIG. 1 Patents

(57) ABSTRACT

Adaptive scheduling of memory requests and processing-in-memory requests is described. In accordance with the described techniques, a memory controller receives a plurality of processing-in-memory requests and a plurality of non-processing-in-memory requests from a host. The memory controller schedules an order of execution for the plurality of processing-in-memory requests and the plurality of non-processing-in-memory requests based at least in part on a processing-in-memory request stall threshold and a non-processing-in-memory request stall threshold. In response to a system switching (e.g., from executing processing-in-memory requests to executing non-processing-in-memory requests or from executing non-processing-in-memory requests to executing processing-in-memory requests), the memory controller modifies the processing-in-memory request stall threshold and the non-processing-in-memory request stall threshold. The memory controller continues scheduling an order of execution for subsequent requests received from the host using the modified stall thresholds.

20 Claims, 7 Drawing Sheets

(56) References Cited

U.S. PATENT DOCUMENTS

| | | | |
|---|---|---|---|
| 10,891,228 B2 | 1/2021 | Steinmacher-Burow | |
| 12,032,925 B1* | 7/2024 | Kim | G06F 7/523 |
| 12,033,710 B2* | 7/2024 | Wong | G11C 29/38 |
| 12,066,950 B2 | 8/2024 | Madan et al. | |
| 2011/0161784 A1 | 6/2011 | Selinger et al. | |
| 2012/0069034 A1 | 3/2012 | Biswas et al. | |
| 2014/0325148 A1 | 10/2014 | Choi et al. | |
| 2014/0365719 A1 | 12/2014 | Kuzmin et al. | |
| 2015/0187043 A1 | 7/2015 | Shebanow et al. | |
| 2016/0246713 A1 | 8/2016 | Choi et al. | |
| 2017/0300422 A1 | 10/2017 | Szubbocsev | |
| 2018/0188970 A1 | 7/2018 | Liu et al. | |
| 2019/0034097 A1 | 1/2019 | Chang et al. | |
| 2019/0065115 A1 | 2/2019 | Kwon et al. | |
| 2019/0079678 A1 | 3/2019 | Malladi et al. | |
| 2019/0392886 A1 | 12/2019 | Cox et al. | |
| 2020/0050397 A1 | 2/2020 | Meyerowitz et al. | |
| 2020/0294558 A1 | 9/2020 | Yu et al. | |
| 2020/0356305 A1 | 11/2020 | Kim et al. | |
| 2021/0110876 A1* | 4/2021 | Seo | G06F 13/1668 |
| 2021/0150311 A1 | 5/2021 | Zhou et al. | |
| 2021/0182190 A1 | 6/2021 | Gao et al. | |
| 2021/0271599 A1 | 9/2021 | Sharovar | |
| 2021/0311634 A1 | 10/2021 | Chang et al. | |
| 2021/0382828 A1 | 12/2021 | Li | |
| 2022/0076717 A1 | 3/2022 | Mathew et al. | |
| 2022/0121398 A1 | 4/2022 | Nale et al. | |
| 2022/0164251 A1 | 5/2022 | He et al. | |
| 2022/0206855 A1 | 6/2022 | Challapalle et al. | |
| 2022/0229575 A1 | 7/2022 | Chen et al. | |
| 2022/0253247 A1 | 8/2022 | Kim et al. | |
| 2022/0253248 A1 | 8/2022 | Yoon et al. | |
| 2022/0283719 A1 | 9/2022 | Eyerman et al. | |
| 2022/0292033 A1 | 9/2022 | Yu et al. | |
| 2022/0374166 A1 | 11/2022 | La Fratta et al. | |
| 2023/0115296 A1 | 4/2023 | Jaser et al. | |
| 2023/0020570 A1 | 6/2023 | Madan et al. | |
| 2023/0205705 A1* | 6/2023 | Poremba | G06F 15/7821 711/203 |
| 2023/0409238 A1* | 12/2023 | Aga | G06F 3/0673 |
| 2024/0004585 A1* | 1/2024 | Ibrahim | G06F 3/0673 |
| 2024/0103745 A1* | 3/2024 | Madan | G06F 3/061 |
| 2024/0160364 A1* | 5/2024 | Dutu | G06F 3/0688 |
| 2024/0168639 A1* | 5/2024 | Aga | G06F 3/0673 |
| 2024/0184702 A1 | 6/2024 | Gouldey et al. | |
| 2024/0220127 A1* | 7/2024 | Lee | G06F 3/0614 |

OTHER PUBLICATIONS

Dutu, A., et al., "US Application as Filed", U.S. Appl. No. 17/986,623, filed Nov. 14, 2022, 37 pages.

Islam, Mahzabeen, et al., "US Application as Filed", U.S. Appl. No. 17/953,723, filed Sep. 27, 2022, 52 pages.

Madan, Nitti, et al., "US Application as Filed", U.S. Appl. No. 17/954,784, Sep. 28, 2022, 47 pages.

Madan, Niti, et al., "US Application as Filed", U.S. Appl. No. 17/561,454, filed Dec. 23, 2021, 35 pages.

U.S. Appl. No. 17/561,454, "Final Office Action", U.S. Appl. No. 17/561,454, Apr. 12, 2023, 13 pages.

U.S. Appl. No. 17/561,454, "Non-Final Office Action", U.S. Appl. No. 17/561,454, Oct. 13, 2023, 11 pages.

U.S. Appl. No. 17/561,454, "Non-Final Office Action", U.S. Appl. No. 17/561,454, Oct. 19, 2022, 11 pages.

PCT/US2023/033820, "International Seach Report and Written Opinion", PCT Application No. PCT/US2023/033820, Jan. 18, 2024, 7 pages.

U.S. Appl. No. 17/561,454, "Notice of Allowance", U.S. Appl. No. 17/561,454, Apr. 10, 2024, 5 pages.

U.S. Appl. No. 17/986,623, "Non-Final Office Action", U.S. Appl. No. 17/986,623, Feb. 14, 2024, 12 pages.

U.S. Appl. No. 17/954,784, "Non-Final Office Action", U.S. Appl. No. 17/954,784, Aug. 28, 2024, 31 pages.

U.S. Appl. No. 17/986,623, "Final Office Action", U.S. Appl. No. 17/986,623, Jul. 22, 2024, 7 pages.

* cited by examiner

ADAPTIVE SCHEDULING OF MEMORY AND PROCESSING-IN-MEMORY REQUESTS

BACKGROUND

Processing-in-memory (PIM) architectures move processing of memory-intensive computations to memory. This contrasts with standard computer architectures which communicate data back and forth between a memory and a remote processing unit. In terms of data communication pathways, remote processing units of conventional computer architectures are further away from memory than processing-in-memory components. As a result, these conventional computer architectures suffer from increased data transfer latency, which can decrease overall computer performance. Further, due to the proximity to memory, PIM architectures can also provision higher memory bandwidth and reduced memory access energy relative to conventional computer architectures particularly when the volume of data transferred between the memory and the remote processing unit is large.

Thus, PIM architectures enable increased computer performance while reducing data transfer latency as compared to conventional computer architectures that implement remote processing hardware. However, in PIM architectures where a memory controller receives requests for both PIM operations (e.g., operations performed by a PIM component) and non-PIM operations (e.g., operations performed by a remote processing unit), extending conventional techniques for scheduling only non-PIM requests (e.g., based on static timing thresholds) to scheduling both PIM and non-PIM requests results in degraded system performance.

DETAILED DESCRIPTION

Overview

Figure 1:
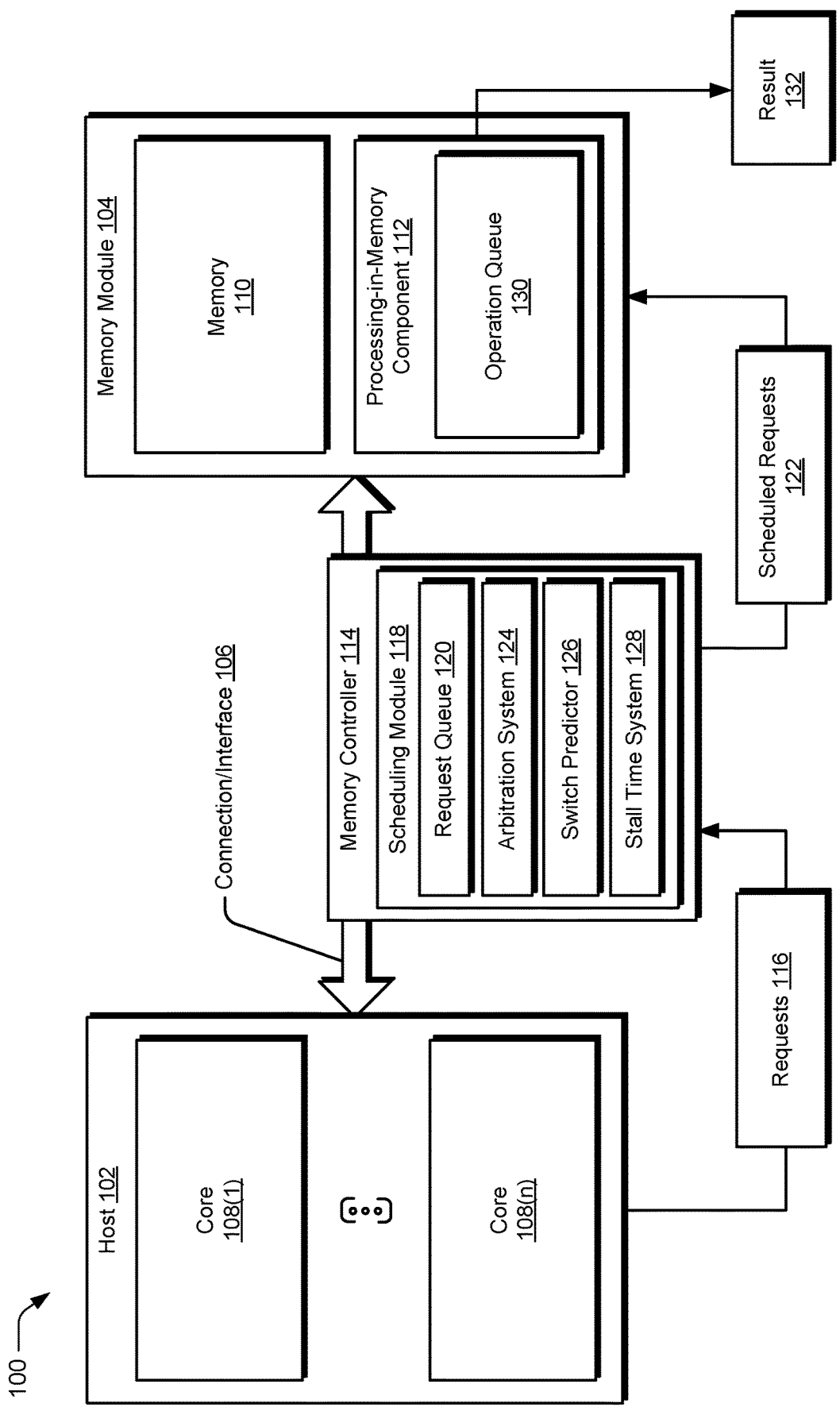
FIG. 1 is a block diagram of an example system having a host with at least one core, a memory module with a memory and a processing-in-memory component, and a memory controller.

Computer architectures with PIM components implement processing devices embedded in memory hardware (e.g., memory chips). By implementing PIM components in memory hardware, PIM architectures are configured to provide memory-level processing capabilities to a variety of applications, such as applications executing on a host processing device that is communicatively coupled to the memory hardware. In such implementations where the PIM component provides memory-level processing for an application executed by the host processing device, the host processing device controls the PIM component by dispatching one or more application operations for performance by the PIM component. In some implementations, operations dispatched by the host processing device for performance by the PIM component are sent in the form of PIM requests to a memory controller.

In addition to scheduling PIM requests for execution by the PIM component, the memory controller is tasked with scheduling non-PIM requests made by the host processing device. In contrast to PIM requests, which are executed by the PIM component using data stored in memory and thus executed by the PIM component independent of (e.g., without) traffic on a connection between memory hardware and the host processing device, executing non-PIM requests involves communicating data from memory hardware to the host processing device for processing by the host processing device. In some cases, executing non-PIM requests further involves communicating data from the host processing device back to memory hardware (e.g., transmitting a result generated by the host processing device to memory hardware for storage).

In implementations, execution of a PIM request requires bank-level parallelism in memory. Bank-level parallelism is defined as different banks of a memory channel being used to service one or more requests in parallel. For instance, in an example scenario where executing a PIM request causes a PIM component to perform an operation using data stored in a defined row of each bank in a dynamic random-access memory (DRAM) channel, bank-level parallelism is required to ensure that each bank in the DRAM channel is available before the PIM request can be executed. In contrast to PIM requests that provide bank-level parallelism in memory (e.g., PIM requests are serviced with memory commands that are sent to all banks in a DRAM channel), non-PIM requests are serviced using memory commands issued to a single row in memory (e.g., a single row of a single DRAM channel bank).

Due to the bank-level parallelism involved with executing PIM requests, scheduling PIM requests and non-PIM requests directed to a common memory channel is challenging. For instance, PIM requests cannot be executed simultaneously with executing non-PIM requests. Accordingly, a memory controller tasked with scheduling both PIM requests and non-PIM requests is also tasked with switching a computing system between two modes: one mode where PIM requests are executed by a PIM component and another mode where non-PIM requests are executed by a host processing device.

One challenge in transitioning from a non-PIM mode (e.g., where only non-PIM requests are executed) to a PIM mode (e.g., where only PIM requests are executed) is that all banks in a memory channel (e.g., all rows in each bank of a DRAM channel) must first be closed. This bank closure is required in order for a PIM component to service (e.g., execute) a PIM request by issuing commands on one or more rows in multiple memory channel banks. Transitioning a computing system from a non-PIM mode to a PIM mode thus incurs a high penalty in terms of computational cost, as each bank in a memory channel needs to be pre-charged.

For instance, in an implementation where a PIM request is executed by a PIM component of a DRAM channel, capacitors of each bank that was previously open need to be charged (e.g., by applying current to a capacitor to rewrite or otherwise restore a data value that was read from the capacitor while the bank was open). After pre-charging memory channel banks, the memory controller is able to switch the system to a PIM mode where a PIM component performs one or more operations (e.g., read, write, etc.) as part of executing a PIM request on one or more rows in each of the memory channel banks.

Computer applications that are coded to include PIM operations typically dispatch PIM requests at irregular intervals. For instance, in an example scenario where a host processing device is running an application that includes both PIM operations and non-PIM operations, the host processing device sends a cadence of non-PIM requests to a memory controller and interleaves the non-PIM request with bursts of PIM requests.

Consequently, because there is not a constant arrival rate of PIM requests at the memory controller in this example scenario, it becomes difficult to decide when to switch between operating in a PIM mode and operating in a non-PIM mode in a manner that optimizes system performance. As described herein, optimizing system performance involves decreasing computational resource consumption, reducing system latency, reducing system power consumption, combinations thereof, and so forth.

Selecting when to switch between a PIM mode and a non-PIM mode is further compounded when non-PIM requests are also received by a memory controller at irregular intervals from a host processing device. Many conventional systems implement static thresholds for switching between a PIM mode and a non-PIM mode based on a stall time of a pending request. For instance, in response to identifying that a PIM request pending at a memory controller has been stalled for a duration that approaches a defined stall time threshold for PIM requests, conventional systems switch from a non-PIM mode to a PIM mode in order to service the PIM request before its stall time satisfies (e.g., is greater than or equal to) the defined stall time threshold for PIM requests.

Similarly, in response to identifying that a non-PIM request has been stalled for a duration that approaches a defined stall time threshold for non-PIM requests, conventional systems switch from a PIM mode to a non-PIM mode in order to service the non-PIM request before its stall time satisfies the defined stall time threshold for non-PIM requests. However, such conventional static stall thresholds are sub-optimal because they do not account for the irregularity of PIM requests received by a memory controller, scenarios where non-PIM requests are received by the memory controller at irregular intervals, a density of PIM requests received in a burst of PIM request by the memory controller, and so forth. Consequently, switching between PIM and non-PIM modes using conventional static thresholds results in unnecessary consumption of computational resources, unnecessary latency in scheduling requests for execution, and overall degraded system performance.

To address these problems facing conventional computer architectures with PIM components, adaptive scheduling of memory requests and processing-in-memory requests is described. In implementations, a system includes a memory module having a memory and a PIM component. The memory module is communicatively coupled to at least one core of at least one host, such as a core of a host processor. The system further includes a memory controller, such as a memory controller implemented locally at a host processor, a memory controller implemented at the memory module, or a memory controller implemented separate from a host processor and separate from the memory module. In implementations, the memory controller implements a scheduling module that is configured to schedule PIM requests and non-PIM requests received at the memory controller.

Advantageously, the scheduling module is configured to switch the system between operating in a PIM mode and operating in a non-PIM mode based on behavior of the at least one host from which requests are received, which is not possible using conventional systems. The scheduling module does so by identifying when to switch between a PIM mode and a non-PIM mode without affecting a quality of service associated with processing PIM transactions or affecting a quality of service associated with processing non-PIM transactions.

To perform the techniques described herein, the memory controller includes a non-PIM queue and a PIM queue. The non-PIM queue is configured to enqueue non-PIM requests (e.g., DRAM commands) received from a host processor and the PIM queue is configured to enqueue PIM requests (e.g., requests to be executed by a PIM component of the memory module) received from the host processor. The scheduling module of the memory controller includes a three-stage arbitration system that schedules PIM requests and non-PIM requests for execution based on request type, request priority, stall thresholds, and a prediction of whether system performance benefits outweigh a cost for switching from a current execution state to a different execution state (e.g., switching between a PIM mode and a non-PIM mode).

The three-stage arbitration system is configured to consider both PIM requests and non-PIM requests at each stage of arbitration. In implementations, a first arbiter (e.g., a first arbitration stage) of the arbitration system selects different types of PIM requests from the memory controller's PIM queue and different types of non-PIM requests from the memory controller's non-PIM queue. For instance, the first arbiter selects a page hit request, a page miss request, and a page conflict request from the PIM queue. The first arbiter additionally selects a page hit request, a page miss request, and a page conflict request from the non-PIM queue.

A second arbiter (e.g., a second arbitration stage) of the arbitration system compares priorities of the requests (both PIM and non-PIM) selected by the first arbiter and outputs a request having a highest associated priority. In scenarios where requests selected by the first arbiter have the same priority, the second arbiter outputs one of the requests according to a request ranking based on request type. In some implementations, the request ranking used by the second arbiter depends on a prediction of whether it will be optimal to schedule PIM requests or schedule non-PIM requests (e.g., whether operating in a PIM mode or a non-PIM mode would improve system performance).

For instance, the second arbiter is configured to consider whether transitioning the system from a current mode to a different mode will provide system performance benefits that outweigh a cost of transitioning the system between modes. The second arbiter is configured to select a request output by the first arbiter based on historical system metrics that represent both a time cost and energy cost to the system that would be required to switch to a different mode at a given cycle. The second arbiter is thus configured to schedule requests for execution at given clock cycles in an order that improves system performance when measured over the different clock cycles used to execute requests scheduled by the memory controller.

In addition to considering request priority information and estimated switching cost, the second arbiter is configured to select from the multiple requests output by the first arbiter based on a PIM request stall threshold and a non-PIM request threshold. The respective thresholds define a time limit for enqueuing requests at the memory controller, such that a PIM request must be scheduled for execution if it has been stalled at the memory controller for a time that satisfies the PIM request stall threshold, and a non-PIM request must be scheduled for execution if it has been stalled at the memory controller for a time that satisfies the non-PIM stall threshold.

In contrast to conventional systems that use static stall thresholds, the scheduling module of the memory controller is configured to dynamically update one or both of the PIM request stall threshold and the non-PIM request stall threshold when the system switches between operating in a PIM mode and operating in a non-PIM mode.

In some implementations, stall thresholds for both PIM requests and non-PIM requests are dynamically updated by computing a difference between a stall time of a first request (e.g., a time between the memory controller receiving and scheduling the first request for execution) executed after the system switch and a corresponding stall threshold for the first request executed after the switch. For instance, the computed difference is added to the stall threshold for requests of a same type as the first request executed after the system switch. Alternatively or additionally, the computed difference is subtracted from the stall threshold for requests of a different type than the first request executed after the system switch. The dynamically updated PIM request stall threshold and the updated non-PIM request stall threshold thus influence a manner in which the second arbiter selects from requests output by the first arbiter, which reduces system switching cost relative to scheduling the same requests using static stall thresholds.

A third arbiter (e.g., a third arbitration stage) of the arbitration system then schedules an execution order for the requests output by the second arbiter. In implementations where the memory controller is tasked with scheduling requests for a memory channel allocated into multiple pseudo-channels (e.g., two or more pseudo-channels), the first and second arbiters are configured to perform their functionality for each pseudo-channel simultaneously. In such scenarios where the memory channel is allocated into multiple pseudo-channels, the third arbiter schedules requests output by the second arbiter (e.g., the priority winner for each of the multiple pseudo-channels) in a round-robin manner.

By implementing the arbitration system and considering historical system performance metrics, the scheduling module is configured to switch the system between operating in a PIM mode and operating in a non-PIM mode based on behavior of the at least one host from which requests are received, which is not possible using conventional systems. The scheduling policy enforced by the scheduling module is thus configured to adapt to dynamic characteristics of PIM and non-PIM operations and/or applications running concurrently in a manner that improves system performance by switching PIM and non-PIM execution modes at optimal cycles, which is also not possible using conventional scheduling policies.

Although described with respect to a single PIM component, the techniques described herein are configured for implementation by multiple processing-in-memory components in parallel (e.g., simultaneously). For instance, in an example scenario where memory is configured as DRAM, a processing-in-memory component is included at each hierarchical DRAM component (e.g., channel, bank, array, and so forth).

In some aspects, the techniques described herein relate to a system including a memory module including a memory and a processing-in-memory component, a host including at least one core, and a memory controller configured to receive a plurality of processing-in-memory requests and a plurality of non-processing-in-memory requests from the host, schedule an order of execution for the plurality of processing-in-memory requests and the plurality of non-processing-in-memory requests based at least in part on a processing-in-memory request stall threshold and a non-processing-in-memory request stall threshold, and modifying the processing-in-memory request stall threshold and the non-processing-in-memory request stall threshold in response to the system switching between executing processing-in-memory requests and executing non-processing-in-memory requests.

In some aspects, the techniques described herein relate to a system, wherein executing the processing-in-memory requests includes causing the processing-in-memory component to execute one or more operations of a transaction using data stored in the memory.

In some aspects, the techniques described herein relate to a system, wherein executing the non-processing-in-memory requests includes transmitting data stored in the memory from the memory module to the host and executing, by the at least one core, one or more operations of a transaction using the data.

In some aspects, the techniques described herein relate to a system, wherein the memory controller is associated with a channel in the memory and the channel in the memory is allocated into two or more pseudo-channels.

In some aspects, the techniques described herein relate to a system, wherein the memory controller is configured to schedule the order of execution by selecting, for each of the two or more pseudo-channels, different types of the plurality of processing-in-memory requests and different types of the non-processing-in-memory requests using a first arbiter.

In some aspects, the techniques described herein relate to a system, wherein the first arbiter selects, for each of the two or more pseudo-channels, one hit request, one miss request, and one conflict request from the plurality of processing-in-memory requests.

In some aspects, the techniques described herein relate to a system, wherein the first arbiter selects, for each of the two or more pseudo-channels, one hit request, one miss request, and one conflict request from the plurality of non-processing-in-memory requests.

In some aspects, the techniques described herein relate to a system, wherein the memory controller is configured to schedule the order of execution by selecting, using a second arbiter and for each of the two or more pseudo-channels, one request from the different types of the plurality of processing-in-memory requests and the different types of the non-processing-in-memory requests that were selected by the first arbiter.

In some aspects, the techniques described herein relate to a system, wherein the second arbiter is configured to select the one request for each of the two or more pseudo-channels based on priority information associated with each of the different types of the plurality of processing-in-memory requests and the different types of the non-processing-in-memory requests that were selected by the first arbiter.

In some aspects, the techniques described herein relate to a system, wherein the second arbiter is configured to select the one request for each of the two or more pseudo-channels based on a time at which each of the different types of the plurality of processing-in-memory requests and the different types of the non-processing-in-memory requests that were selected by the first arbiter is stalled at the memory controller.

In some aspects, the techniques described herein relate to a system, wherein the second arbiter is configured to select the one request for each of the two or more pseudo-channels based on an estimated cost of: switching the system from executing processing-in-memory requests to executing non-processing-in-memory requests; or switching the system from executing non-processing-in-memory requests to executing processing-in-memory requests.

In some aspects, the techniques described herein relate to a system, wherein the memory controller is configured to schedule the order of execution using a third arbiter that defines an ordering of requests selected by the second arbiter.

In some aspects, the techniques described herein relate to a system, wherein the memory controller is further configured to predict, while the system is executing processing-in-memory requests, a first cycle for switching to executing non-processing-in-memory requests based on historical data describing a number of hits per row and a measured number of open rows in the memory while the system was previously executing non-processing-in-memory requests.

In some aspects, the techniques described herein relate to a system, wherein the memory controller is further configured to predict, while the system is executing non-processing-in-memory requests, a second cycle for switching to executing processing-in-memory requests based on historical data describing a measured number of hits per row in the memory while the system was previously executing processing-in-memory requests.

In some aspects, the techniques described herein relate to a system, wherein the memory controller is further configured to: switch the system from executing processing-in-memory requests to executing non-processing-in-memory request at the first cycle; and switch the system from executing non-processing-in-memory requests to executing processing-in-memory requests at the second cycle.

In some aspects, the techniques described herein relate to a system, wherein the memory controller is further configured to compute a difference between a time at which a first request executed after the system switching was stalled at the memory controller and a corresponding one of the processing-in-memory request stall threshold or the non-processing-in-memory request stall threshold.

In some aspects, the techniques described herein relate to a system, wherein the first request executed after the system switching is a processing-in-memory request and modifying the processing-in-memory request stall threshold and the non-processing-in-memory request stall threshold includes generating a modified processing-in-memory request stall threshold by adding the difference to the processing-in-memory request stall threshold, and generating a modified non-processing-in-memory request stall threshold by subtracting the difference from the non-processing-in-memory request stall threshold.

In some aspects, the techniques described herein relate to a system, wherein the first request executed after the system switching is a non-processing-in-memory request and modifying the processing-in-memory request stall threshold and the non-processing-in-memory request stall threshold includes generating a modified processing-in-memory request stall threshold by subtracting the difference from the processing-in-memory request stall threshold, and generating a modified non-processing-in-memory request stall threshold by adding the difference to the non-processing-in-memory request stall threshold.

In some aspects, the techniques described herein relate to a method including switching, by a memory controller of a system, operation of the system from executing non-processing-in-memory requests to executing processing-in-memory requests, and modifying, by the memory controller, a processing-in-memory request stall threshold for the system and a non-processing-in-memory request stall threshold for the system in response to the switching by computing a difference between the processing-in-memory request stall threshold and a time at which a first processing-in-memory request executed after the switching was stalled at the memory controller, generating a modified processing-in-memory request stall threshold by adding the difference to the processing-in-memory request stall threshold, and generating a modified non-processing-in-memory request stall threshold by subtracting the difference from the non-processing-in-memory request stall threshold.

In some aspects, the techniques described herein relate to a method including switching, by a memory controller of a system, operation of the system from executing processing-in-memory requests to executing non-processing-in-memory requests, and modifying, by the memory controller, a processing-in-memory request stall threshold for the system and a non-processing-in-memory request stall threshold for the system in response to the switching by computing a difference between the non-processing-in-memory request stall threshold and a time at which a first non-processing-in-memory request executed after the switching was stalled at the memory controller, generating a modified non-processing-in-memory request stall threshold by adding the difference to the non-processing-in-memory request stall threshold, and generating a modified processing-in-memory request stall threshold by subtracting the difference from the processing-in-memory request stall threshold.

FIG. 1 is a block diagram of a system 100 that includes a host with at least one core, a memory module with a memory and a PIM component, and a memory controller configured to grant requests by the host for the PIM component to perform transactions. In particular, the system 100 includes host 102 and memory module 104, where the host 102 and the memory module 104 are communicatively coupled via connection/interface 106. In one or more implementations, the host 102 includes at least one core 108. In some implementations, the host 102 includes multiple cores 108. For instance, in the illustrated example of FIG. 1, host 102 is depicted as including core 108(1) and core 108(n), where n represents any integer. The memory module 104 includes memory 110 and processing-in-memory component 112.

In accordance with the described techniques, the host 102 and the memory module 104 are coupled to one another via a wired or wireless connection, which is depicted in the illustrated example of FIG. 1 as the connection/interface 106. Example wired connections include, but are not limited to, buses (e.g., a data bus), interconnects, traces, and planes. Examples of devices in which the system 100 is implemented include, but are not limited to, supercomputers and/or computer clusters of high-performance computing (HPC) environments, servers, personal computers, laptops, desktops, game consoles, set top boxes, tablets, smartphones, mobile devices, virtual and/or augmented reality devices, wearables, medical devices, systems on chips, and other computing devices or systems.

The host 102 is an electronic circuit that performs various operations on and/or using data in the memory 110. Examples of the host 102 and/or a core 108 of the host include, but are not limited to, a central processing unit (CPU), a graphics processing unit (GPU), a field programmable gate array (FPGA), an accelerated processing unit (APU), and a digital signal processor (DSP). For example, in one or more implementations a core 108 is a processing unit that reads and executes instructions (e.g., of a program), examples of which include to add data, to move data, and to branch data.

In one or more implementations, the memory module 104 is a circuit board (e.g., a printed circuit board), on which the memory 110 is mounted and includes the processing-in-memory component 112. In some variations, one or more integrated circuits of the memory 110 are mounted on the circuit board of the memory module 104, and the memory module 104 includes one or more processing-in-memory components 112. Examples of the memory module 104 include, but are not limited to, a TransFlash memory module, a single in-line memory module (SIMM), and a dual in-line memory module (DIMM). In one or more implementations, the memory module 104 is a single integrated circuit device that incorporates the memory 110 and the processing-in-memory component 112 on a single chip. In some examples, the memory module 104 is composed of multiple chips that implement the memory 110 and the processing-in-memory component 112 that are vertically ("3D") stacked together, are placed side-by-side on an interposer or substrate, or are assembled via a combination of vertical stacking or side-by-side placement.

The memory 110 is a device or system that is used to store information, such as for immediate use in a device (e.g., by a core 108 of the host 102 and/or by the processing-in-memory component 112). In one or more implementations, the memory 110 corresponds to semiconductor memory where data is stored within memory cells on one or more integrated circuits. In at least one example, the memory 110 corresponds to or includes volatile memory, examples of which include random-access memory (RAM), dynamic random-access memory (DRAM), synchronous dynamic random-access memory (SDRAM), and static random-access memory (SRAM).

In some implementations, the memory 110 corresponds to or includes a cache memory of the core 108 and/or the host 102 such as a level 1 cache, a level 2 cache, a level 3 cache, and so forth. For example, the memory 110 represents high bandwidth memory (HBM) in a 3D-stacked implementation. Alternatively or additionally, the memory 110 corresponds to or includes non-volatile memory, examples of which include solid state disks (SSD), flash memory, read-only memory (ROM), programmable read-only memory (PROM), erasable programmable read-only memory (EPROM), and electronically erasable programmable read-only memory (EEPROM). The memory 110 is thus configurable in a variety of ways that benefit from adaptive request scheduling without departing from the spirit or scope of the described techniques.

Broadly, the processing-in-memory component 112 is configured to process processing-in-memory operations involved as part of one or more transactions (e.g., operations of a transaction received from the core 108 via the connection/interface 106). The processing-in-memory component 112 is representative of a processor with example processing capabilities ranging from relatively simple (e.g., an adding machine) to relatively complex (e.g., a CPU/GPU compute core). In an example, the processing-in-memory component 112 processes the one or more transactions by executing associated operations using data stored in the memory 110.

Processing-in-memory contrasts with standard computer architectures which obtain data from memory, communicate the data to a remote processing unit (e.g., a core 108 of the host 102), and process the data using the remote processing unit (e.g., using a core 108 of the host 102 rather than the processing-in-memory component 112). In various scenarios, the data produced by the remote processing unit as a result of processing the obtained data is written back to memory, which involves communicating the produced data over the connection/interface 106 from the remote processing unit to memory. In terms of data communication pathways, the remote processing unit (e.g., a core 108 of the host 102) is further away from the memory 110 than the processing-in-memory component 112, both physically and topologically. As a result, conventional computer architectures suffer from increased data transfer latency, reduced data communication bandwidth, and increased data communication energy, particularly when the volume of data transferred between the memory and the remote processing unit is large, which can also decrease overall computer performance.

Thus, the processing-in-memory component 112 enables increased computer performance while reducing data transfer energy as compared to standard computer architectures that implement remote processing hardware. Further, the processing-in-memory component 112 alleviates memory performance and energy bottlenecks by moving one or more memory-intensive computations closer to the memory 110. Although the processing-in-memory component 112 is illustrated as being disposed within the memory module 104, in some examples, the described benefits of memory verification using processing-in-memory are realizable through near-memory processing implementations in which the processing-in-memory component 112 is disposed in closer proximity to the memory 110 (e.g., in terms of data communication pathways) than a core 108 of the host 102.

The system 100 is further depicted as including memory controller 114. The memory controller 114 is configured to receive requests 116 from the host 102 (e.g., from a core 108 of the host 102). In the illustrated example, the requests 116 represent one or more PIM requests, one or more non-PIM requests, or a combination thereof. Although depicted in the example system 100 as being implemented separately from the host 102, in some implementations the memory controller is implemented locally as part of the host 102. The memory controller 114 is further configured to schedule requests 116 for a plurality of hosts, despite being depicted in the illustrated example of FIG. 1 as serving only a single host 102. For instance, in an example implementation the memory controller 114 schedules PIM requests and non-PIM requests for a plurality of different hosts, where each of the plurality of different hosts include one or more cores that requests 116 to the memory controller 114 for scheduling with the memory module.

In accordance with one or more implementations, the memory controller 114 is associated with a single channel of the memory 110. For instance, the system 100 is configured to include a plurality of different memory controllers 114, one for each of a plurality of channels of memory 110. The techniques described herein are thus performable using a plurality of different memory controllers to schedule requests for different channels of memory 110. In some implementations, a single channel in memory 110 is allocated into multiple pseudo-channels. In such implementations, the memory controller 114 is configured to schedule requests 116 for different pseudo-channels of a single channel in the memory 110.

As depicted in the illustrated example of FIG. 1, the memory controller 114 includes a scheduling module 118. The scheduling module 118 is representative of logic configured to schedule requests 116 (e.g., both PIM requests and non-PIM requests) for execution in a manner that optimizes performance of the system 100 (e.g., limits computational resource consumption, decreases latency, and reduces power consumption of the system 100) when measured over execution of the requests 116. Advantageously, using the techniques described herein, the scheduling module 118 is configured to predict optimal cycles for switching between executing PIM requests and executing non-PIM requests and adaptively modifying stall thresholds associated with PIM request and non-PIM requests.

To perform the techniques described herein, the scheduling module 118 includes a request queue 120. The request queue 120 is configured to maintain a queue of the requests 116 received at the memory controller 114 from the host 102. In implementations, the request queue 120 is representative of two separate queues—one queue for maintaining PIM requests and another queue for maintaining non-PIM requests. The scheduling module 118 is configured to schedule an order of requests 116 maintained in the request queue 120 for execution (e.g., by the processing-in-memory component 112 or by the host 102) using the techniques described herein. As depicted in the illustrated example of FIG. 1, requests selected from the request queue 120 for execution by the scheduling module 118 are represented as scheduled requests 122. In some implementations, the scheduling module 118 selects a single requests from the request queue 120 for inclusion in the scheduled requests 122 per clock cycle of the system 100. Alternatively, the scheduling module 118 selects multiple requests from the request queue 120 for inclusion in the scheduled requests 122 per clock cycle.

To determine an ordering of the scheduled requests 122, the scheduling module 118 employs an arbitration system 124, a switch predictor 126, and a stall time system 128. The arbitration system 124 is configured to select, for each pseudo-channel of the memory 110, one request from the request queue 120 for output as part of the scheduled requests 122 using a three-stage arbitration process. During the three-stage arbitration process, both PIM requests and non-PIM requests are considered at each stage of arbitration. The arbitration system 124 considers priority information associated with each request enqueued in the request queue 120 in determining which requests to select and order for output as part of the scheduled requests 122. In addition to considering request priority, the arbitration system 124 schedules PIM request and non-PIM request for execution based on request type, request stall thresholds, and an estimated cost for switching from a current execution state/mode to a different execution state/mode. Functionality of the arbitration system 124 is described in further detail below with respect to FIG. 2.

The switch predictor 126 is configured to estimate a cost associated with switching the system 100 from a current operating state to a different operating state (e.g., a cost of switching between a PIM mode and a non-PIM mode). The switch predictor 126 is configured to estimate the switching cost based on historical system metrics, which are recorded and maintained by the switch predictor 126. As described herein, the switching cost estimated by the switch predictor 126 represents both a time cost and energy cost to the system that would be required to switch to a different mode at a given cycle. Based on the estimated switching cost, the switch predictor 126 is used by the scheduling module 118 to schedule requests for execution at designated clock cycles, ordered in a manner that improves performance of the system 100 when measured over the different clock cycles used to execute the requests 116. Functionality of the switch predictor 126 is described in further detail below with respect to FIG. 3.

The stall time system 128 is configured to adaptively update stall thresholds for PIM requests and non-PIM requests, where respective ones of the stall thresholds define an acceptable time limit for maintaining a corresponding request (e.g., PIM request or non-PIM request) at the memory controller 114. For instance, a PIM request stall threshold defines a time limit for enqueueing a PIM request from the requests 116 at the request queue 120, such that the PIM request must by output as one of the scheduled requests 122 after being enqueued at the request queue 120 for the PIM request stall threshold. Likewise, a non-PIM request stall threshold defines a time limit for enqueueing a non-PIM request from the requests 116 at the request queue 120, such that the non-PIM request must by output as one of the scheduled requests 122 after being enqueued at the request queue 120 for the non-PIM request stall threshold.

By dynamically updating request stall thresholds, the stall time system 128 enables adaptive scheduling of PIM requests and non-PIM requests in a manner that considers current and historical system behavior, which is not possible using conventional static stall thresholds. In implementations, the stall time system 128 updates stall thresholds for PIM requests and non-PIM requests by computing a difference between a stall time of a first request executed after the system 100 switches modes (e.g., a time between the memory controller 114 receiving and one of the requests 116 and outputting the one of the requests 116 as part of the scheduled requests 122, where the one of the requests 116 corresponds to a first request executed by the processing-in-memory component 112 or the host 102 following the switch).

This computed difference is then used to modify both a PIM request stall threshold and a non-PIM request stall threshold. For instance, the stall time system 128 adds the computed difference to the stall threshold for requests of a same type as the first request executed after the system switch. Alternatively or additionally, the stall time system 128 subtracts the computed difference from the stall threshold for requests of a different type than the first request executed after the system switch. Stall threshold adjustments computed and applied by the stall time system 128 thus influence how the arbitration system 124 schedules requests from the request queue 120 in a manner that reduces switching costs for the system 100, as measured over execution of the requests 116, relative to executing the requests 116 using static thresholds. Functionality of the stall time system 128 is described in further detail below with respect to FIG. 4.

PIM requests included in the scheduled requests 122 are transmitted by the memory controller 114 to an operation queue 130 of the processing-in-memory component 112. The operation queue 130 is representative of a data storage structure in the processing-in-memory component 112 that maintains an ordered list of operations scheduled for sequential execution by the processing-in-memory component 112 using data stored in memory 110. As part of executing a PIM request, the processing-in-memory component 112 generates a result 132 that includes data generated from processing data stored in the memory 110 during one or more operations involved in executing a PIM request.

Instructions included in a PIM request for outputting the result 132 are configurable in a variety of manners. For instance, in some implementations executing a PIM request causes the processing-in-memory component 112 to communicate the result 132 to a requesting source for the transaction (e.g., the host 102). Alternatively or additionally, in some implementations instructions included in the PIM request cause the processing-in-memory component 112 to output the result 132 to a storage location in memory 110 (e.g., to update data stored in memory 110, for subsequent access and/or retrieval by the host 102, and so forth). Alternatively or additionally, in some implementations instructions included in the PIM request cause the processing-in-memory component 112 to store the result 132 locally (e.g., in a register of the processing-in-memory component 112).

Because the processing-in-memory component 112 executes PIM requests on behalf of the host 102, the processing-in-memory component 112 is configured to execute PIM requests with minimal impact on the system 100 (e.g., without invalidating caches of the system 100 or causing traffic on the connection/interface 106). For instance, the processing-in-memory component 112 performs PIM request on the memory 110 "in the background" with respect to the host 102 and the core 108, which frees up cycles of the host 102 and/or the core 108, reduces memory bus traffic (e.g., reduces traffic on the connection/interface 106), and reduces power consumption relative to performing operations at the host 102 and/or the core 108. Notably, because the processing-in-memory component 112 is closer to the memory 110 than the core 108 of the host 102 in terms of data communication pathways, evaluating data stored in memory 110 is generally completable in a shorter amount of time using the processing-in-memory component 112 than if the evaluation were performed using the core 108 of the host 102.

Non-PIM requests included in the scheduled requests 122 include one or more commands that cause the memory module 104 to transmit data stored in the memory 110 (e.g., at one or more storage locations identified by a non-PIM request) to the host 102 (e.g., via the interface 106) for further processing. In some implementations, executing a non-PIM request causes the host 102 to output a result to a storage location in memory 110 (e.g., to update data stored in memory 110, for subsequent access and/or retrieval by the host 102 or the processing-in-memory component 112, and so forth). Alternatively or additionally, in some implementations instructions included in the non-PIM request cause the host 102 to store a result of the non-PIM request locally (e.g., in a buffer, a register, or the like of the host 102).

Figure 2:
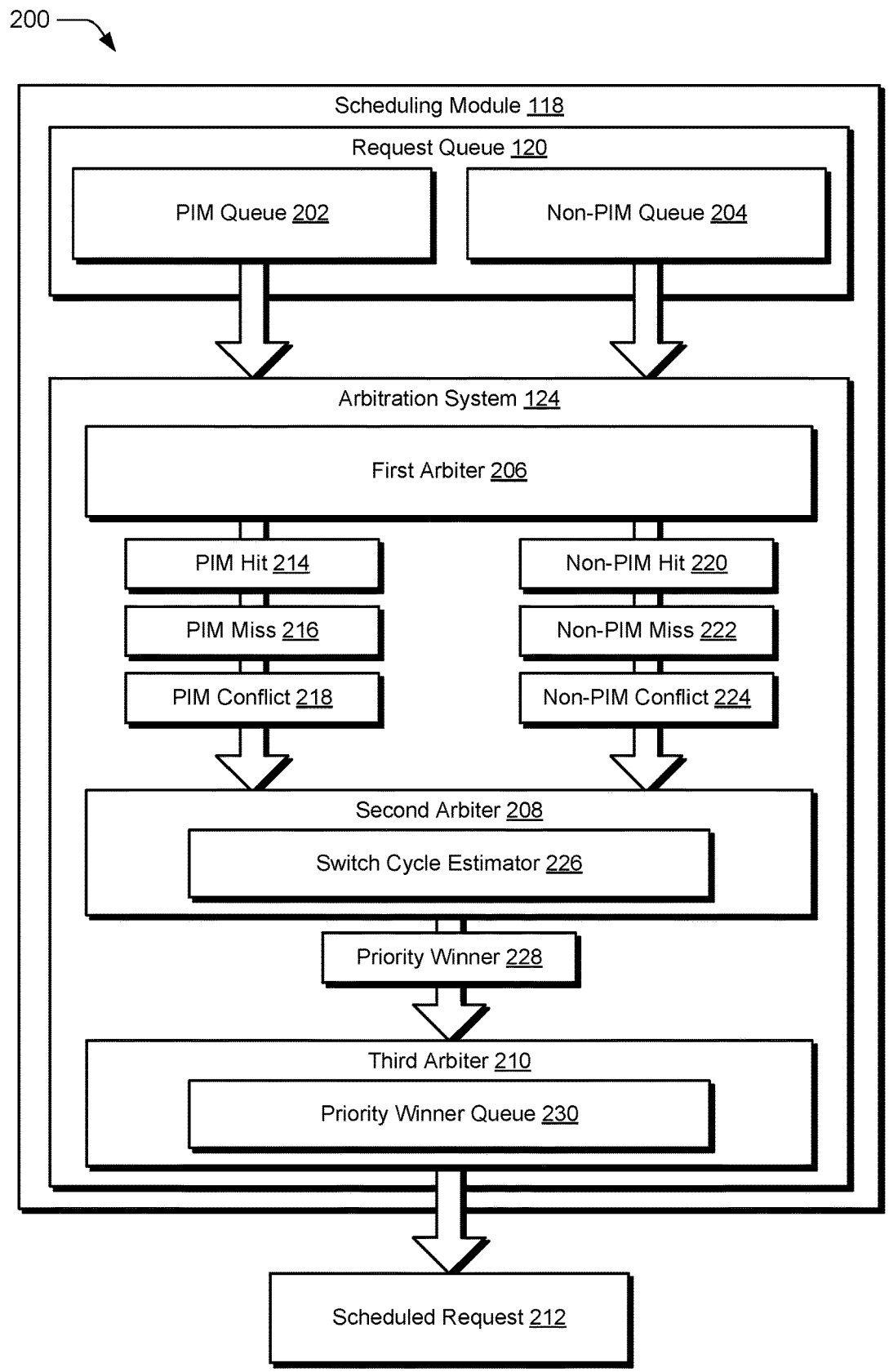
FIG. 2 depicts an example of adaptive scheduling of memory requests and processing-in-memory requests.

FIG. 2 depicts an example 200 of adaptive scheduling of memory requests and processing-in-memory requests.

The example 200 is depicted as including the scheduling module 118, the request queue 120, and the arbitration system 124 of the memory controller 114. In the example 200, the request queue 120 includes a PIM queue 202 and a non-PIM queue 204. The PIM queue 202 is configured to maintain PIM requests included in the requests 116 received at the memory controller 114 and the non-PIM queue 204 is configured to maintain non-PIM requests included in the requests 116 received at the memory controller 114. In implementations, each request enqueued at the request queue 120 (e.g., in the PIM queue 202 or the non-PIM queue 204) includes information describing a thread identifier for the request.

In implementations, the thread identifier associated with a request is generated by the memory controller 114 and represents a combination of a requestor identifier (e.g., an identifier of the host 102 from which the request was received) and a process identifier (e.g., a process, thread, or stream of requests with which the request is associated). By generating thread identifiers for different requests, the memory controller 114 ensures that enqueued requests for a same process/thread are scheduled in order relative to one another, while allowing for requests from different processes/threads to be scheduled out of order relative to one another (e.g., based on request priority, switching cost associated with scheduling a request at a given cycle, and so forth).

As depicted in the example 200, the arbitration system 124 is configured as a three-stage arbitration system that is configured to schedule an order of execution for requests maintained in the request queue 120. Different stages of the arbitration system 124 are represented in the illustrated example 200 by the first arbiter 206, the second arbiter 208, and the third arbiter 210. The first arbiter 206, the second arbiter 208, and the third arbiter 210 work together to select requests from both the PIM queue 202 and the non-PIM queue 204 and output one of the selected requests as a scheduled request 212, where the scheduled request 212 represents a request included in the scheduled requests 122.

In implementations, the first arbiter 206 is configured to select different types of PIM requests from the PIM queue 202 and select different types of non-PIM requests from the non-PIM queue 204. For instance, the first arbiter 206 selects a PIM hit 214 request, a PIM miss 216 request, and a PIM conflict 218 request from the PIM queue 202. The first arbiter 206 further selects a non-PIM hit 220 request, a non-PIM miss 222 request, and a non-PIM conflict 224 request from the non-PIM queue 204. As described herein, a hit request (e.g., a PIM hit 214 or a non-PIM hit 220) refers to a request that, at the time of execution, uses data stored in a memory location that is already open (e.g., a request for data stored in a DRAM row of the memory 110 that is open). A miss request (e.g., a PIM miss 216 or a non-PIM miss 222) refers to a request that, at the time of execution, uses data stored in a memory location that is not open (e.g., a request for data stored in a closed DRAM row of the memory 110). A conflict request (e.g., a PIM conflict 218 or a non-PIM conflict 224) refers to a request that, at the time of execution, requires use of data that is being used by at least one other request.

In some implementations, the first arbiter 206 identifies whether a request maintained in the request queue 120 will be a hit, a miss, or a conflict if scheduled at a certain clock cycle of the system 100 based on scheduled requests 122 previously ordered for execution by the memory controller 114. In one or more implementations, the first arbiter 206 selects PIM requests from the PIM queue 202 and non-PIM requests from the non-PIM queue 204 based on respective request stall times. For instance, the first arbiter 206 selects the PIM hit 214 request by identifying a plurality of PIM requests in the PIM queue 202 that would be hits if scheduled and selects from the plurality of PIM requests a request that has been stalled the longest at the memory controller 114. The first arbiter 206 is thus configured to ensure that a request is not enqueued at the request queue 120 for a stall time that satisfies (e.g., is greater than or equal to) a corresponding stall threshold for the request.

The second arbiter 208 is configured to select, from the PIM request and non-PIM requests output by the first arbiter 206, a priority winner 228, where the priority winner 228 represents one of the PIM hit 214 request, the PIM miss 216 request, the PIM conflict 218 request, the non-PIM hit 220 request, the non-PIM miss 222 request, or the non-PIM conflict 224 request. In implementations, the second arbiter 208 selects the priority winner 228 by comparing respective priority information associated with the PIM hit 214 request, the PIM miss 216 request, the PIM conflict 218 request, the non-PIM hit 220 request, the non-PIM miss 222 request, and the non-PIM conflict 224 request.

The priority of a request is determined by comparing a stall time of the request, which indicates how long the request has been maintained in the request queue 120, to a stall threshold for the request (e.g., a PIM request threshold for a PIM request or a non-PIM stall threshold for a non-PIM request). In this manner, the arbitration system 124 escalates priority information for a request as a stall time for a request approaches a stall threshold for the request type. In implementations where the requests output by the first arbiter 206 are associated with different priorities, the second arbiter 208 outputs a request associated with a highest priority as the priority winner 228.

In implementations where requests output by the first arbiter 206 are associated with the same priority, the second arbiter 208 selects one of the requests output by the first arbiter 206 based on a request ranking that considers different requests based on type (e.g., PIM hit, PIM miss, PIM conflict, non-PIM hit, non-PIM miss, or non-PIM conflict). In some implementations, the request ranking used by the second arbiter 208 depends on whether it will be optimal to switch from a current operating mode to a different operating mode (e.g., switch between a PIM mode and a non-PIM mode) at a cycle near or where the priority winner 228 is to be executed. For instance, in an example implementation where it is optimal to schedule PIM requests, the second arbiter 208 uses a first request ranking that favors non-PIM hits, over PIM hits, over PIM misses, over non-PIM misses, over PIM conflicts, over non-PIM conflicts. In an example implementation where it is optimal to schedule non-PIM requests, the second arbiter 208 uses a second request ranking that favors non-PIM hits, over PIM hits, over non-PIM misses, over PIM misses, over non-PIM conflicts, over PIM conflicts.

To estimate whether it will be optimal to switch from a current operating mode to a different operating mode at a cycle near or where the priority winner 228 is to be executed, the second arbiter 208 employs a switch cycle estimator 226. The switch cycle estimator 226 is configured to store information describing a predicted cycle during which transitioning the system 100 will be optimal. Transitioning the system 100 from a mode in which the system 100 is operating, or is scheduled to be operating, prior to executing the priority winner 228, to a different mode, is considered optimal if transitioning will provide system performance benefits that outweigh a cost of switching the system 100 to the different mode (e.g., a cost for switching between a PIM mode and a non-PIM mode). In implementations, the switching cost estimator 226 is configured as a 1-bit prediction buffer, a 2-bit prediction buffer, a correlating prediction buffer, a tournament predictor, a TAgged GEometric length (TAGE) predictor, a multi-layer perceptron, a long short-term memory transformer, a gated multi-layer perceptron, combinations thereof, and so forth. The switch cycle estimator 226 is configured to identify a future cycle during which it will be optimal to switch from a current mode to a different mode based on historical system performance characteristics, such as maximum number of row hits and maximum number of rows opened in different banks of memory 110 while servicing past requests. In response to identifying patterns of requests maintained in the request queue 120 that are similar to historical request patterns associated with optimal system performance characteristics, the switch cycle estimator 226 is trained to predict future cycles for switching the system 100 between modes.

In implementations, the switch cycle estimator predicts an optimal cycle for switching between modes based on historical system metrics representing both a time cost and energy cost for switching the system to a different mode at a given cycle. The switch cycle estimator 226 thus causes the second arbiter 208 to schedule requests for execution at given clock cycles in an order that improves performance of the system 100 when measured over the different clock cycles used to execute requests 116.

In some implementations, the switch cycle estimator 226 identifies that it is optimal to switch from operating in a non-PIM mode to operating in a PIM mode when doing so will result in a maximum number of PIM hits and when the number of potential PIM hits is greater than a number of potential non-PIM hits multiplied by a number of banks in a channel (or pseudo-channel) of the memory 110. In implementations, the maximum number of PIM hits is application-specific (e.g., specific to an application being run by the host 102 as part of generating the requests 116) and estimated based on historical instances of the host 102 running the application.

Alternatively or additionally, the switch cycle estimator 226 identifies that it is optimal to switch from operating in a PIM mode to operating in a non-PIM mode when doing so will result in a maximum number of non-PIM hits, bank-level parallelism, and when the number of potential non-PIM hits multiplied by a number of banks in a channel (or pseudo-channel) of the memory 110 is greater than a number of potential PIM hits. In implementations, the maximum number of non-PIM hits is application-specific (e.g., specific to an application being run by the host 102 as part of generating the requests 116) and estimated based on historical instances of the host 102 running the application.

In addition to considering request priority information and estimated switching cost, the second arbiter 208 is configured to select from the multiple requests output by the first arbiter 206 based on a PIM request stall threshold and a non-PIM request threshold (e.g., as defined by the stall time system 128, described in further detail below with respect to FIG. 4). The respective thresholds define a time limit for enqueuing requests at the memory controller, such that a PIM request must be scheduled for execution if it has been stalled at the memory controller 114 for a time that satisfies the PIM request stall threshold, and a non-PIM request must be scheduled for execution if it has been stalled at the memory controller 114 for a time that satisfies the non-PIM stall threshold.

The third arbiter 210 adds the priority winner 228 to a priority winner queue 230 and selects priority winners from the priority winner queue 230 for output as the scheduled request 212. In implementations where the memory controller 114 is associated with a single channel in memory that is not allocated into multiple pseudo-channels, the priority winner 228 is directly output by the third arbiter 210 as the scheduled request 212. Alternatively, in implementations where the memory controller 114 is associated with a channel in memory 110 that is allocated into multiple pseudo-channels, the arbitration system 124 is configured to perform the functionality described herein for each of the multiple pseudo-channels simultaneously.

For instance, the first arbiter 206 selects a PIM hit 214 request, a PIM miss 216 request, a PIM conflict 218 request, a non-PIM hit 220 request, a non-PIM miss 222 request, and a non-PIM conflict 224 request for each of the multiple pseudo-channels. The second arbiter 208 then selects a priority winner 228 for each of the multiple pseudo-channels. In such an implementation where a memory channel is allocated into multiple pseudo-channels, the priority winners 228 for each of the pseudo-channels are individually output as a scheduled request 212 from the priority winner queue 230 by the third arbiter 210 in a round-robin manner.

By implementing the arbitration system 124 and considering historical system performance metrics, the scheduling module 118 is configured to switch the system 100 between operating in a PIM mode and operating in a non-PIM mode based on behavior of a source (e.g., the host 102) from which requests 116 are received, which is not possible using conventional systems.

Figure 3:
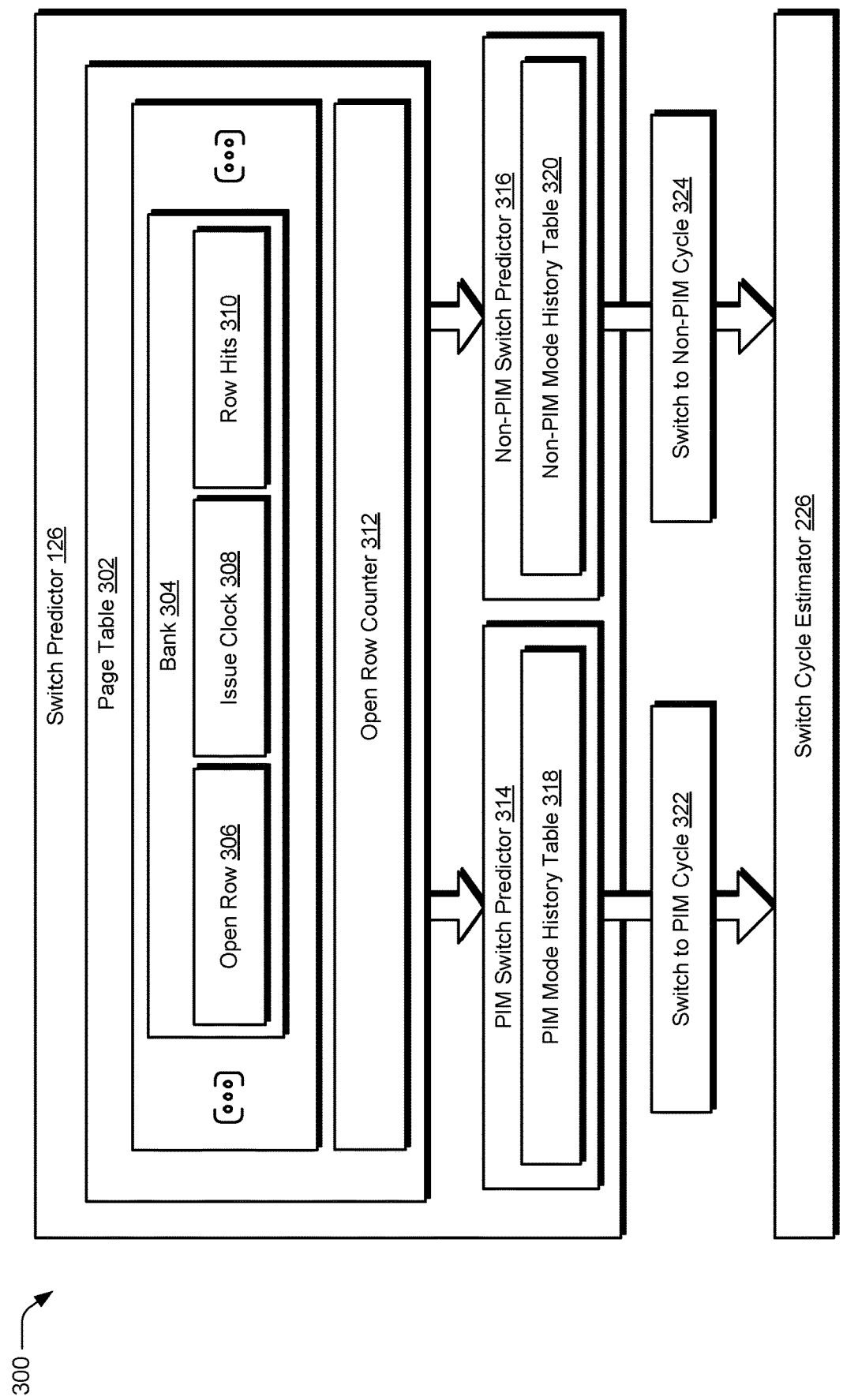
FIG. 3 depicts an example of estimating a cost associated with switching between executing processing-in-memory requests and executing non-processing-in-memory requests for adaptively scheduling memory requests and processing-in-memory requests.

FIG. 3 depicts an example 300 of estimating a cost associated with switching between executing processing-in-memory requests and executing non-processing-in-memory requests for adaptively scheduling memory requests and processing-in-memory requests.

The example 300 is illustrated as including the switch predictor 126 and the switch cycle estimator 226. In order to predict if switching the system 100 from a PIM mode to a non-PIM mode, or switching the system 100 from a non-PIM mode to a PIM mode, at a given clock cycle is optimal, the switch predictor 126 maintains a page table 302 that records information describing a current state of the system. For instance, the page table 302 is configured to record information that describes, for each bank 304 of a channel or pseudo-channel in memory 110, an open row 306 in the bank 304 (e.g., which DRAM row in the bank 304 is being used to execute a non-PIM request).

The page table 302 additionally records the issue clock 308 of the first request that opened the row indicated by the open row 306. The issue clock 308 is representative of information describing a time indicated by a system clock (e.g., a system clock of the system 100) when the open row 306 was opened by a request. The issue clock 308 thus informs the switch predictor 126 as to when the open row 306 was opened, a period of time during which the open row 306 was open, and so forth. The page table 302 further records a number of row hits 310 for the row indicated by the open row 306. Although only depicted in the illustrated example 300 as recording metrics for a single open row 306 in a single bank 304, the page table 302 is configured to record data for multiple different banks 304, information for multiple different open rows 306 in a single bank 304, and combinations thereof. When the system 100 is operating in a non-PIM mode, the page table 302 updates an open row counter 312 to indicate a maximum number of rows that were opened in one or more of the bank 304 while the system was operating in the non-PIM mode. In implementations where the memory 110 is configured as DRAM, a row is opened when row capacitors are depleted of charge to release stored data. Conversely, a DRAM row is closed when row capacitors are recharged, and stored values are written back to the row capacitors.

The switch predictor 126 is further depicted as including a PIM switch predictor 314 and a non-PIM switch predictor 316. The PIM switch predictor 314 is configured to maintain a PIM mode history table 318, which is representative of a data structure that includes entries representing one or more requests executed by the system 100 (e.g., one or more of the requests 116 executed by the processing-in-memory component 112) while in a PIM mode. The PIM mode history table 318, for instance, is updated by the PIM switch predictor 314 to enter a one or a zero indicating whether scheduling a PIM request at a given clock cycle will result in a maximum row locality (e.g., whether scheduling the PIM request at the clock cycle will result in a threshold number of row hits in an open row 306 of the bank 304).

In implementations, the threshold number of row hits that represents a maximum row locality is application-specific (e.g., specific to an application being run by the host 102 as part of generating the requests 116) and estimated based on historical instances of the host 102 running the application while in PIM mode. For instance, the PIM switch predictor 314 is configured to update the PIM mode history table 318 after a row in memory 110 is closed while the system 100 is operating in a PIM mode. In some implementations, the PIM switch predictor 314 leverages a row identifier (e.g., a row number) of the open row 306 indicated in the page table 302 and the issue clock 308 of the first request executed using the open row 306 to do so.

In a similar manner, the non-PIM switch predictor 316 maintains a non-PIM mode history table 320, which is representative of a data structure that includes entries representing one or more requests executed by the system 100 (e.g., one or more of the requests 116 executed by the host 102) while in a non-PIM mode. The non-PIM mode history table 320, for instance, is updated by the non-PIM switch predictor 316 to include values indicating whether scheduling a non-PIM request at a given clock cycle will provide a maximum number of row hits and a maximum number of open rows (e.g., whether scheduling the non-PIM request at the clock cycle will result in a threshold number of row hits and/or a threshold number of simultaneous open rows in one or more banks 304 of memory 110).

In implementations, the threshold number of row hits is application-specific (e.g., specific to an application being run by the host 102 as part of generating the requests 116) and estimated based on historical instances of the host 102 running the application while in non-PIM mode. For instance, the non-PIM switch predictor 316 is configured to update the non-PIM mode history table 320 after a row in memory 110 is closed while the system 100 is operating in a non-PIM mode.

To do so, non-PIM switch predictor 316 leverages a row identifier (e.g., a row number) of the open row 306 indicated in the page table 302 and the issue clock 308 of the first request executed using the open row 306. The row identifier is associated in the non-PIM mode history table 320 with a maximum number of non-PIM row hits recorded together with a maximum number of open rows indicated by the open row counter 312 while the row was open. The associated information (e.g., maximum numbers of row hits and open rows) is indexed with the row identifier of the open row 306, the issue clock 308 of the first request indexed to the row identifier, and a bank number of the bank 304 and maintained in the non-PIM mode history table 320. The non-PIM mode history table 320 is thus representative of historical metrics describing bank-level parallelism associated with various non-PIM requests and informs the switch predictor 126 as to how many requests will be hits in different banks 304 of the memory 110.

The PIM switch predictor 314 is configured to predict an optimal cycle at which the system 100 should be switched from operating in a non-PIM mode to operating in a PIM mode, as indicated by the switch to PIM cycle 322. In a similar manner, the non-PIM switch predictor 316 is configured to predict an optimal cycle at which the system 100 should be switched from operating in a PIM mode to operating in a non-PIM mode, as indicated by the switch to non-PIM cycle 324. By maintaining and updating the PIM mode history table 318 and the non-PIM mode history table 320 as requests 116 are received at the memory controller 114 and executed by the host 102 and/or the processing-in-memory component 112, the switch predictor 126 is configured to learn from historical system performance metrics.

In this manner, when tasked with scheduling the requests 116 for execution, the scheduling module 118 is configured to consider historical system information maintained by the switch predictor 126 to estimate a cost associated with scheduling one of the requests 116 at a particular clock cycles. For instance, based on information maintained in the PIM mode history table 318 and the non-PIM mode history table 320, the switch predictor 126 informs the switch cycle estimator 226 as to an amount of row locality that is estimated to result from issuing a PIM request at a certain clock cycle (e.g., whether scheduling a PIM request at a clock cycle is likely to achieve maximum row locality or whether it is likely more beneficial to wait until more PIM requests are enqueued). The historical information represented by the PIM mode history table 318 and the non-PIM mode history table 320 further enables the switch predictor 126 to inform the switch cycle estimator 226 of an injection rate of requests 116 received by the memory controller 114 and other dynamic load characteristics of the host 102.

In addition to informing the switch cycle estimator 226 of an ideal cycle for switching from a non-PIM mode to a PIM mode (e.g., switch to PIM cycle 322) and an ideal cycle for switching from a PIM mode to a non-PIM mode (e.g., switch to non-PIM cycle 324), the switch predictor 126 informs the switch cycle estimator 226 of an estimated cost associated with the corresponding switch of each cycle. In implementations, the switching cost is representative of both a time cost and an energy cost imparted on the system 100.

For instance, the time cost component of a cost for switching between a PIM mode and a non-PIM mode refers to a number of idle cycles on a data bus (e.g., the interface 106), where the system 100 could otherwise be executing requests 116. The energy cost component of a cost for switching between a PIM mode and a non-PIM mode refers to an amount of pre-charging required to switch from one mode to another (e.g., in order to service a PIM requests, all rows of a bank 304 must be closed so that the processing-in-memory component 112 can read data from the rows).

Frequently switching between PIM mode and non-PIM mode imparts a higher time cost, thus the switch predictor 126 identifies an ideal cycle for switching from a non-PIM mode to a PIM mode (e.g., switch to PIM cycle 322) and an ideal cycle for switching from a PIM mode to a non-PIM mode (e.g., switch to non-PIM cycle 324) that are spaced based on an amount of requests maintained in the request queue 120, row locality that would be achieved by operating in a PIM mode or a non-PIM mode, as well as bank-level parallelism that would be achieved by operating in a non-PIM mode. Switching from a PIM mode to a non-PIM mode when an enqueued string of non-PIM requests are only directed to a single row of a bank 304 in memory 110 is also sub-optimal and would result in system inefficiencies by opening a single row for servicing non-PIM requests while precluding enqueued PIM requests from being able to operate using multiple rows (e.g., all rows) of the bank 304.

The ideal cycles represented by the switch to PIM cycle 322 and the switch to non-PIM cycle 324 are determined using data stored in the PIM mode history table 318 and the non-PIM mode history table 320. In this manner, the switch predictor 126 is configured to estimate more accurate switching costs as the system 100 operates, learning from past performance metrics. Generally, the switch to PIM cycle 322 represents a cycle at which there will be a minimum number of open rows (e.g., a minimum number of rows being used to service non-PIM requests) and a maximum number of PIM hit requests being stalled at the request queue 120.

In a similar manner, the switch to non-PIM cycle 324 generally represents a cycle at which there is a maximum number of non-PIM hit requests being stalled at the request queue 120 and there are a maximum number of rows to be opened for servicing enqueued non-PIM requests. As indicated above, these maximum and minimum values are dependent on one or more applications running on the host 102 and are learned by the switch predictor 126 over time.

To account for the dynamic manner in which the memory controller 114 switches the system 100 from operating in a PIM mode to operating in a non-PIM mode, and vice versa, the scheduling module 118 is configured to dynamically update stall thresholds associated with PIM requests and non-PIM requests maintained at the request queue 120.

Figure 4:
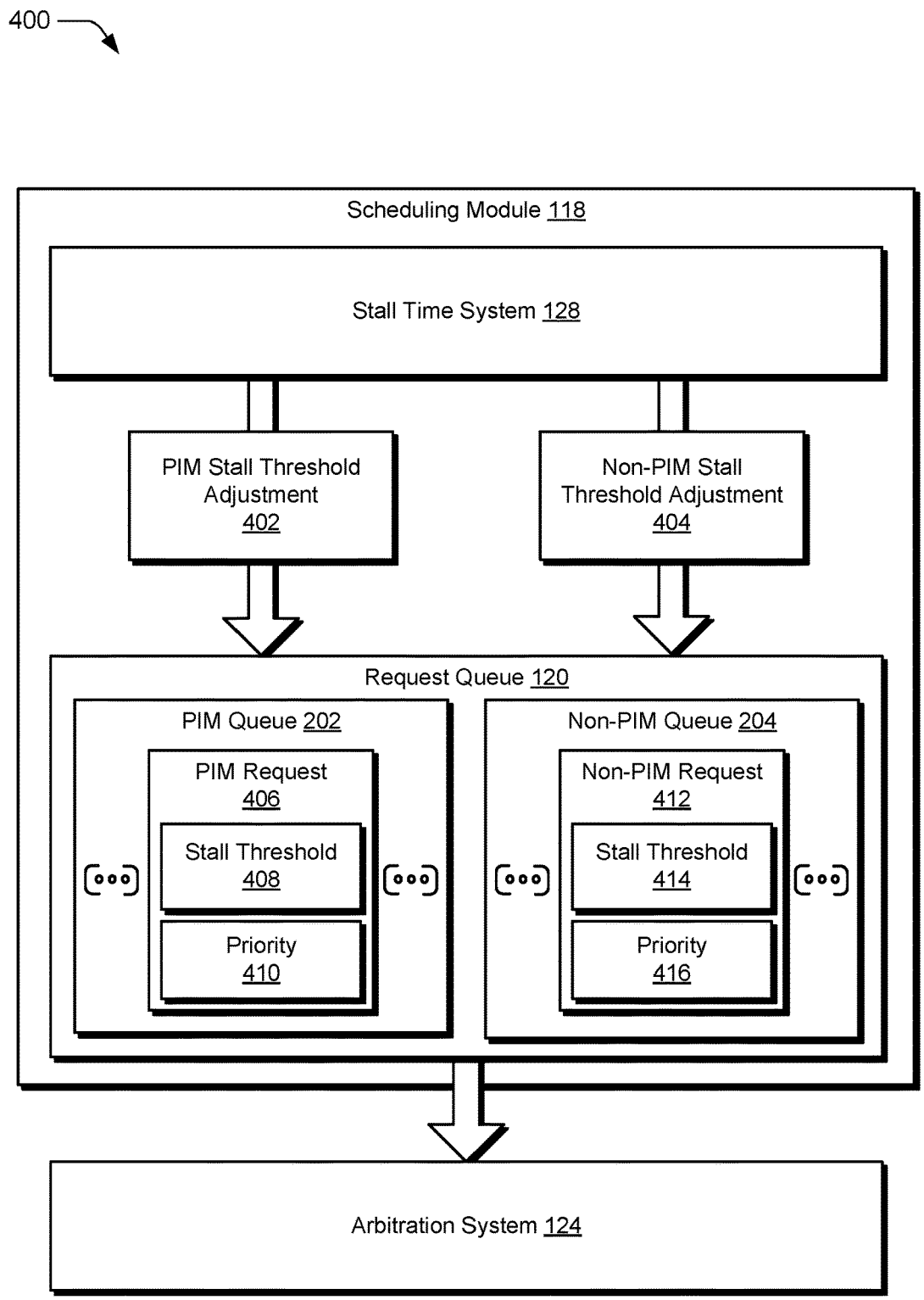
FIG. 4 depicts an example of adjusting a processing-in-memory request stall threshold and a non-processing-in-memory request stall threshold as part of adaptively scheduling memory requests and processing-in-memory requests.

FIG. 4 depicts an example 400 of adjusting a processing-in-memory request stall threshold and a non-processing-in-memory request stall threshold as part of adaptively scheduling memory requests and processing-in-memory requests.

The illustrated example 400 is depicted as including the scheduling module 118 of the memory controller 114, the stall time system 128, the request queue 120, and the arbitration system 124). In some implementations, the memory controller 114 designates a default PIM request stall threshold and a default non-PIM request stall threshold for enqueuing requests 116 at the request queue 120. In implementations, the default PIM request stall threshold and the default non-PIM request stall threshold are selected by the memory controller 114 based on an injection rate at which the requests 116 are received from the host 102. Alternatively or additionally, the memory controller 114 selects default stall thresholds based on an amount of enqueued requests (e.g., selects a PIM stall threshold based on a number of PIM requests enqueued at the PIM queue 202 and selects a non-PIM stall threshold based on a number of non-PIM requests enqueued at the non-PIM queue 204).

Given default stall thresholds, the stall time system 128 is configured to dynamically adjust at least one of the PIM request stall threshold or the non-PIM request stall threshold as the system 100 switches between operating in a PIM mode and operating in a non-PIM mode. For instance, when the system 100 switches between operating in a PIM mode and operating in a non-PIM mode, the stall time system 128 computes a PIM stall threshold adjustment 402 and a non-PIM stall threshold adjustment 404.

The stall time system 128 is configured to compute a PIM stall threshold adjustment 402 and a non-PIM stall threshold adjustment 404 at a system mode switch by computing a difference between a stall time of a first request that is executed after the system switch and a corresponding stall threshold for the first request executed after the system switch. The stall time of the first request that is executed after the system switch (e.g., the first PIM request executed after switching to a PIM mode or the first non-PIM request executed after switching to a non-PIM mode) is defined as the duration beginning when the first request is received by the memory controller 114 (e.g., as part of the requests 116) and when the first request is scheduled for execution (e.g., a cycle at which the first request is scheduled to be executed as part of scheduled requests 122).

In implementations, the stall time system 128 adds this computed difference to an existing stall threshold for requests of a same type as the first request executed after the system switch (e.g., added to an existing PIM request stall threshold upon switching to a PIM mode or added to an existing non-PIM request stall threshold upon switching to a non-PIM mode). The stall time system 128 alternatively or additionally subtracts this computed difference from an existing stall threshold for requests of a different type than the first request executed after the system switch (e.g., subtracted from an existing non-PIM request stall threshold upon switching to a PIM mode or subtracted from an existing PIM request stall threshold upon switching to a non-PIM mode).

At each instance of the system 100 switching between a PIM mode and a non-PIM mode, the stall time system 128 computes a PIM stall threshold adjustment 402 and a non-PIM stall threshold adjustment 404 and updates stall thresholds for requests 116 enqueued at the request queue 120 accordingly. For instance, the stall time system 128 communicates the PIM stall threshold adjustment 402 and the non-PIM stall threshold adjustment 404 to the request queue 120 for use in updating stall thresholds associated with enqueued requests. As an example, a PIM request 406 enqueued in the PIM queue 202 is associated with a PIM request stall threshold 408 that is updated using the PIM stall threshold adjustment 402. Updating the PIM request stall threshold 408 consequently updates a priority 410 associated with the PIM request 406. For instance, increasing the PIM request stall threshold 408 decreases the priority 410 and decreasing the PIM request stall threshold 408 increases the priority 410 for the PIM request 406.

In a similar manner, a non-PIM request 412 enqueued in the non-PIM queue 204 is associated with a non-PIM request stall threshold 414 that is updated using the non-PIM stall threshold adjustment 404. Updating the non-PIM request stall threshold 414 consequently updates a priority 416 associated with the non-PIM request 412. For instance, decreasing the non-PIM request stall threshold 414 increases the priority 416 and increasing the non-PIM request stall threshold 414 decreases the priority 416.

The dynamically updated PIM request stall threshold and the dynamically updated non-PIM request stall threshold, as defined by the stall time system 128, thus influence a manner in which the arbitration system 124 selects requests 116 for output as scheduled requests 122. Further, by computing the PIM stall threshold adjustment 402 and the non-PIM stall threshold adjustment 404 at cycles when the system 100 is switched between PIM and non-PIM modes, as computed by the switch predictor 126, the modified stall thresholds improve system performance when measured over execution of the requests 116 relative to scheduling the same requests 116 using static stall thresholds.

Figure 5:
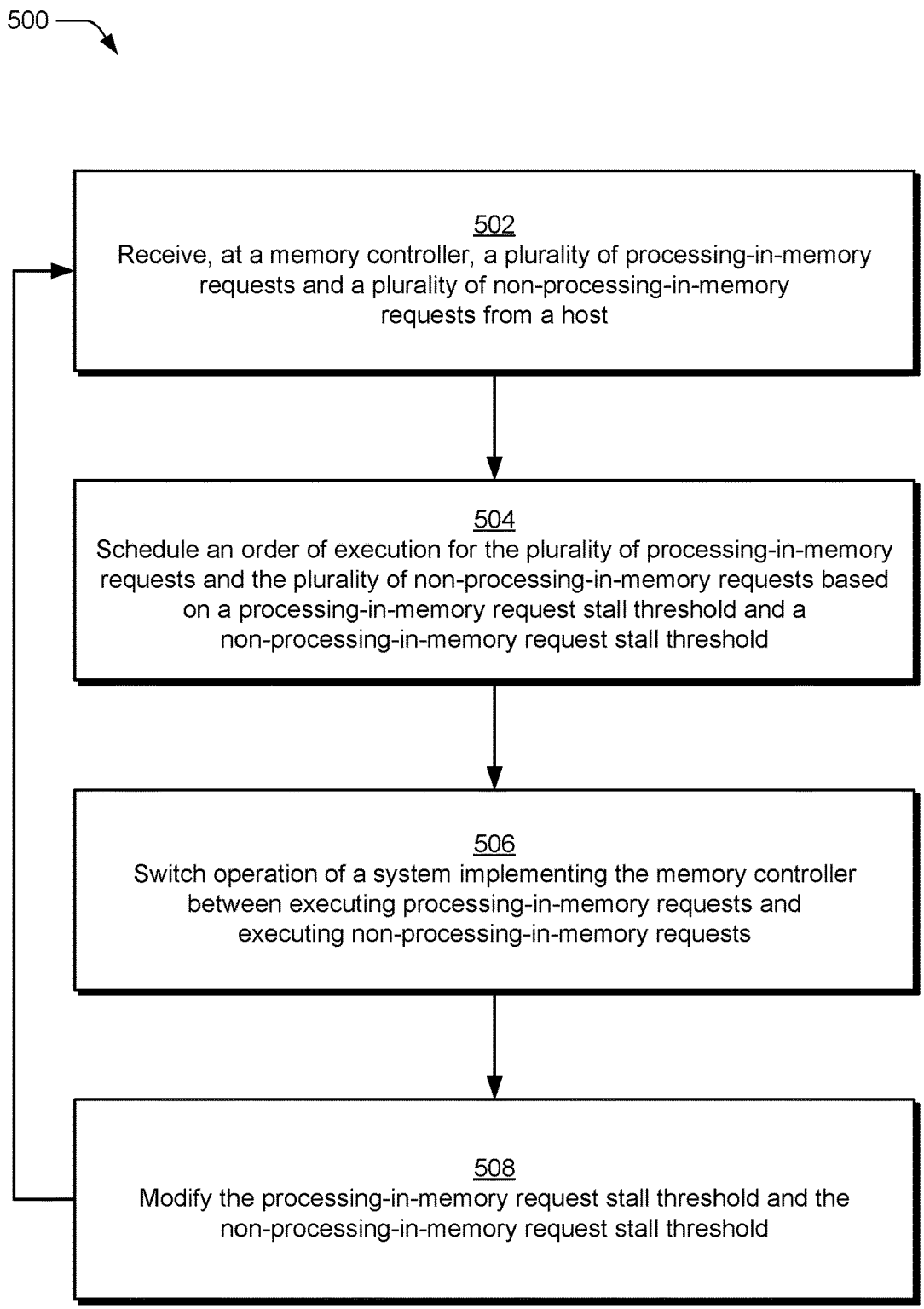
FIG. 5 depicts a procedure in an example implementation of adaptively scheduling memory requests and processing-in-memory requests.

FIG. 5 depicts a procedure 500 in an example implementation of adaptively scheduling memory and processing-in-memory requests.

A plurality of processing-in-memory requests and a plurality of non-processing in memory requests are received from a host at a memory controller (block 502). The memory controller 114, for instance, receives requests 116 from host 102.

An order of execution for the plurality of processing-in-memory requests and the plurality of non-processing-in-memory requests is scheduled based on a processing-in-memory request stall threshold and a non-processing-in-memory request stall threshold (block 504). The arbitration system 124 of the scheduling module 118, for instance, schedules an order of the requests 116 for execution and outputs the scheduled order of requests as the scheduled requests 122. In implementations, the arbitration system 124 orders the requests 116 for output as the scheduled requests 122 based on a PIM request stall threshold 408 and a non-PIM request stall threshold 414 adaptively updated by the stall time system 128 during operation of the system 100.

Operation of a system implementing the memory controller is switched between executing processing-in-memory requests and executing non-processing-in-memory requests (block 506). The switch predictor 126, for instance, monitors current and historical performance of the system 100 and predicts a switch to PIM cycle 322 and a switch to non-PIM cycle 324 for transitioning the system between executing PIM requests and executing non-PIM requests.

In response to the system switching operation modes, the processing-in-memory request stall threshold and the non-processing-in-memory request stall threshold are modified (block 508). The stall time system 128, for instance, computes a PIM stall threshold adjustment 402 and modifies the PIM request stall threshold 408 using the PIM stall threshold adjustment 402. The stall time system 128 additionally computes a non-PIM stall threshold adjustment 404 and modifies the non-PIM request stall threshold 414 using the non-PIM stall threshold adjustment 404. Operation of the procedure 500 proceeds for additional requests 116 received at the memory controller 114, as indicated by the arrow returning to block 502 from block 508.

Figure 6:
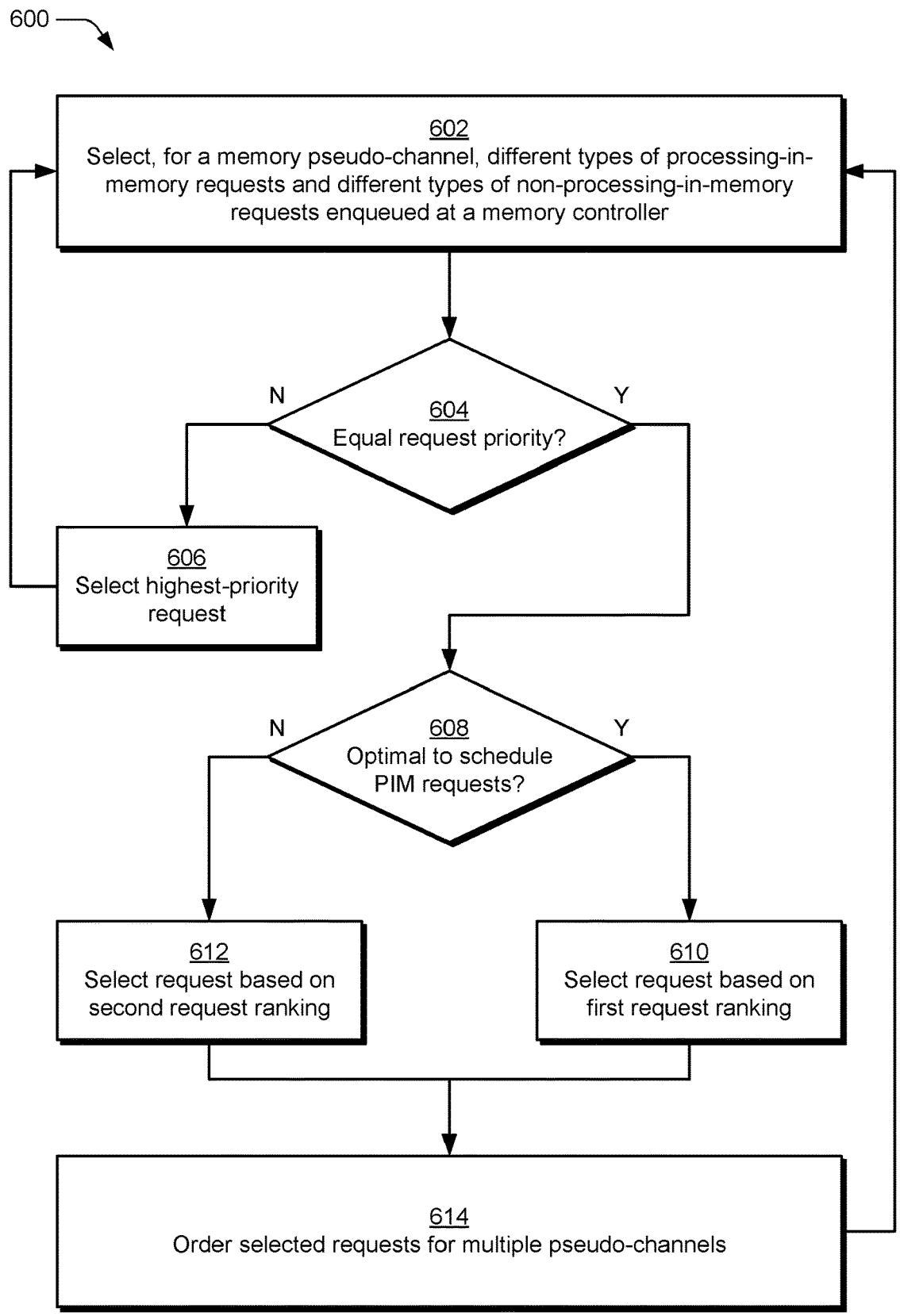
FIG. 6 depicts a procedure in an example implementation of ordering memory requests and processing-in-memory requests using a multi-stage arbitration system as part of adaptively scheduling memory requests and processing-in-memory requests.

FIG. 6 depicts a procedure 600 in an example implementation of adaptively scheduling memory and processing-in-memory requests.

Different types of processing-in-memory requests and different types of non-processing-in-memory requests enqueued at a memory controller are selected (block 602). The arbitration system 124, for instance, uses the first arbiter 206 to select a PIM hit 214 request, a PIM miss 216 request, and a PIM conflict 218 request from the PIM queue 202. The arbitration system 124 further uses the first arbiter 206 to select a non-PIM hit 220 request, a non-PIM miss 222 request, and a non-PIM conflict 224 request from the non-PIM queue 204.

A determination is made as to whether the selected requests are of equal priority (block 604). The arbitration system 124, for instance, uses the second arbiter 208 to compare priority information associated with PIM requests and non-PIM requests output by the first arbiter 206 and identify whether the different requests are each associated with a common (e.g., the same) priority. In response to identifying that requests output by the first arbiter 206 are associated with different priorities (e.g., a "No" determination at block 604), the highest-priority request is selected (block 606). The second arbiter 208, for instance, identifies one of the requests output by the first arbiter 206 having the highest associated priority information (e.g., having the least difference between time stalled at the request queue 120 and an associated stall threshold for the request) and outputs the identified request as the priority winner 228. Operation of the procedure then continues by returning to block 602.

Alternatively, in response to identifying that requests output by the first arbiter 206 are associated with a common priority (e.g., a "Yes" determination at block 604), a determination is made as to whether it is optimal to schedule PIM requests (block 608). The second arbiter 208 for instance, implements switch cycle estimator 226, which informs the arbitration system 124 as to an optimal cycle for switching the system 100 to a PIM mode and an optimal cycle for switching the system 100 to a non-PIM mode, as estimated by the switch predictor 126.

In response to determining that it would be optimal to schedule the priority winner 228 for a PIM mode (e.g., a "Yes" determination at block 608), a request is selected based on a first request ranking (block 610). Alternatively, in response to determining that it would be optimal to schedule the priority winner 228 for a non-PIM mode (e.g., a "No" determination at block 608), a request is selected based on a second request ranking (block 612).

The second arbiter 208, for instance, uses a first request ranking that favors non-PIM hits, over PIM hits, over PIM misses, over non-PIM misses, over PIM conflicts, over non-PIM conflicts. Alternatively, the second arbiter 208 uses a second request ranking that favors non-PIM hits, over PIM hits, over non-PIM misses, over PIM misses, over non-PIM conflicts, over PIM conflicts. The second arbiter 208 thus selects from equal priority requests output by the first arbiter 206 to output a priority winner 228 based on the first request ranking or the second request ranking.

The selected requests are then ordered for multiple pseudo-channels (block 614). The arbitration system 124, for instance, causes the third arbiter 210 to maintain a priority winner queue 230 that stores the priority winner 228 output by the second arbiter 208 for each of one or more pseudo-channels of a channel in memory 110 to which the memory controller 114 is assigned. In implementations where the priority winner queue 230 includes priority winners 228 for multiple pseudo-channels, the third arbiter 210 outputs individual ones of the priority winner 228 as a scheduled request 212 by cycling through different pseudo-channel priority winners in a round-robin selection process. After outputting a scheduled request 212 for each memory pseudo-channel, operation of the procedure 600 continues by returning to block 602.

Figure 7:
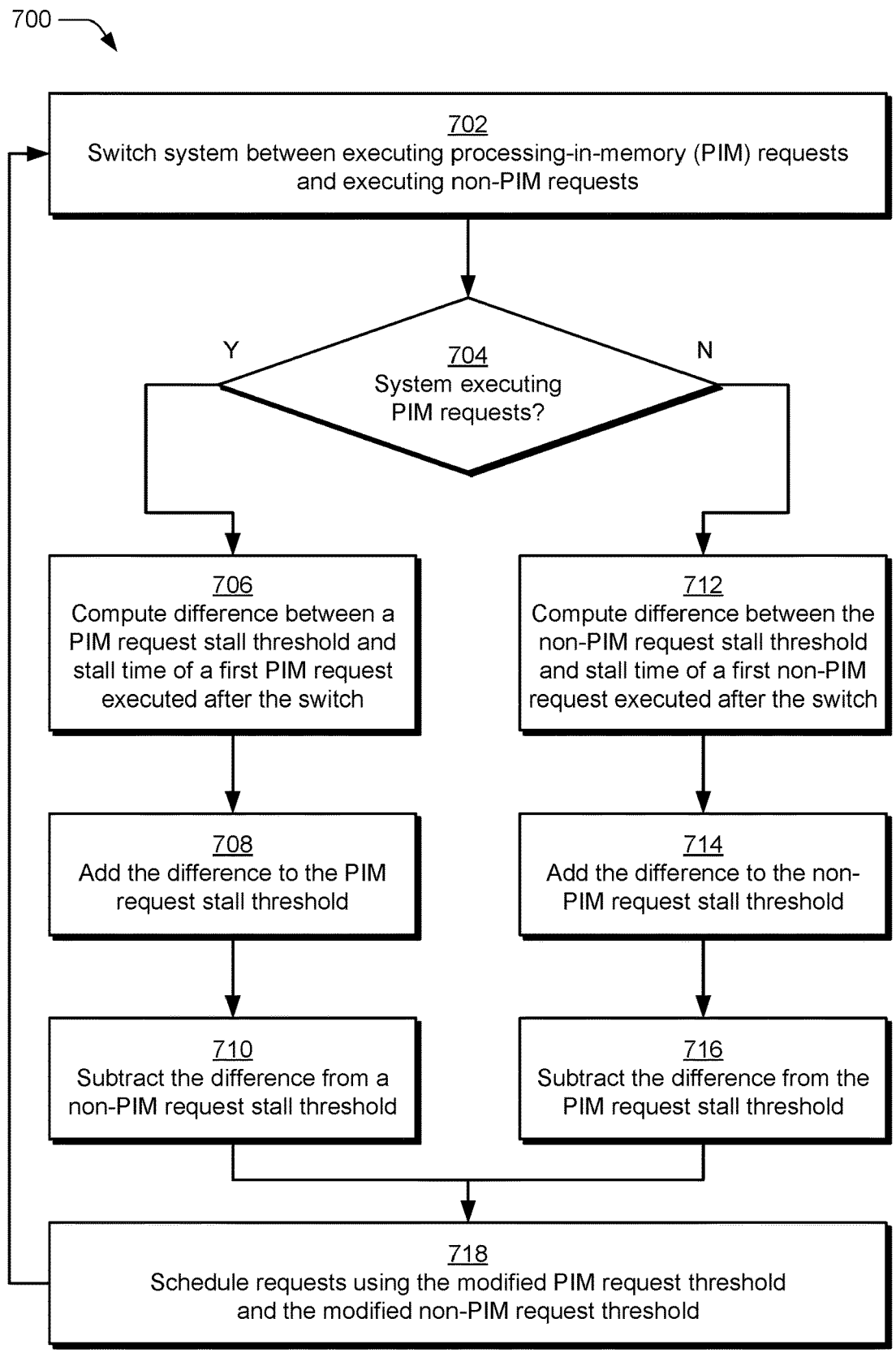
FIG. 7 depicts a procedure in an example implementation of adjusting a processing-in-memory request stall threshold and a non-processing-in-memory request stall threshold as part of adaptively scheduling memory requests and processing-in-memory requests.

FIG. 7 depicts a procedure 700 in an example implementation of adaptively scheduling memory and processing-in-memory requests.

A system is switched between executing processing-in-memory (PIM) requests and executing non-PIM requests (block 702). The memory controller 114, for instance, causes the system 100 to switch from executing non-PIM requests to executing PIM requests, or causes the system 100 to switch from executing PIM requests to executing non-PIM requests.

A determination is made as to whether the system is executing PIM requests following the switch (block 704). In response to a first one of the scheduled requests 122 executed after the system switch being a PIM request executed by the processing-in-memory component 112 (e.g., a "Yes" determination at block 704), a difference between a PIM request stall threshold and a time at which the first one of the scheduled requests 122 was stalled at the request queue 120 is computed (block 706). The stall time system 128, for instance, identifies a PIM request stall threshold 408 and computes the difference by subtracting a time at which the first one of the scheduled requests 122 executed after the system switch was maintained in the PIM queue 202 from the PIM request stall threshold 408.

The difference is then added to the PIM request stall threshold (block 708). The stall time system 128, for instance, increments the PIM request stall threshold 408 using the PIM stall threshold adjustment 402. The difference is also subtracted from a non-PIM request stall threshold (block 710). The stall time system 128, for instance, decrements the non-PIM request stall threshold 414 using the non-PIM stall threshold adjustment 404. In implementations, both the PIM stall threshold adjustment 402 and the non-PIM stall threshold adjustment 404 are representative of the difference computed in block 706.

Alternatively, in response to a first one of the scheduled requests 122 executed after the system switch being a non-PIM request executed by the host 102 (e.g., a "No" determination at block 704), a difference between a non-PIM stall threshold and a time at which the first one of the scheduled requests 122 was stalled at the request queue 120 is computed (block 712). The stall time system 128, for instance, identifies a non-PIM request stall threshold 414 and computes the difference by subtracting a time at which the first one of the scheduled requests 122 executed after the system switch was maintained in the non-PIM queue 204 from the non-PIM request stall threshold 414.

The difference is then added to the non-PIM request stall threshold (block 714). The stall time system 128, for instance, increments the non-PIM request stall threshold 414 using the non-PIM stall threshold adjustment 404. The difference is also subtracted from a PIM request stall threshold (block 716). The stall time system 128, for instance, decrements the PIM request stall threshold 408 using the PIM stall threshold adjustment 402. In implementations, both the PIM stall threshold adjustment 402 and the non-PIM stall threshold adjustment 404 are representative of the difference computed in block 712.

Operation of procedure 700 then proceeds, either from block 710 or block 716, to schedule requests using the modified PIM request threshold and the modified non-PIM request threshold (block 718). The arbitration system 124, for instance, selects an ordering of requests 116 for output as scheduled requests 122 based on updated request priority information resulting from stall thresholds updated by the stall time system 128. Performing the operations of procedure 700 continues at the next system switch, as indicated by the arrow returning to block 702 from block 718.

The example techniques described herein are merely illustrative and many variations are possible based on this disclosure. Although features and elements are described above in particular combinations, each feature or element is usable alone without the other features and elements or in various combinations with or without other features and elements.

The various functional units illustrated in the figures and/or described herein (including, where appropriate, the host 102 having the core 108, the memory module 104 having the memory 110 and the processing-in-memory component 112, and the memory controller 114 having the scheduling module 118) are implemented in any of a variety of different manners such as hardware circuitry, software or firmware executing on a programmable processor, or any combination of two or more of hardware, software, and firmware. The methods provided are implemented in any of a variety of devices, such as a general-purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general-purpose computer or a processor. Examples of non-transitory computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A system comprising:
a memory module including a memory and a processing-in-memory component;
a host including at least one core; and
a memory controller configured to:
receive a plurality of processing-in-memory requests and a plurality of non-processing-in-memory requests from the host;
schedule an order of execution for the plurality of processing-in-memory requests and the plurality of non-processing-in-memory requests based at least in part on a processing-in-memory request stall threshold and a non-processing-in-memory request stall threshold; and
modifying the processing-in-memory request stall threshold and the non-processing-in-memory request stall threshold in response to the system switching between executing processing-in-memory requests and executing non-processing-in-memory requests.

2. The system of claim 1, wherein executing the processing-in-memory requests comprises causing the processing-in-memory component to execute one or more operations of a transaction using data stored in the memory.

3. The system of claim 1, wherein executing the non-processing-in-memory requests comprises transmitting data stored in the memory from the memory module to the host and executing, by the at least one core, one or more operations of a transaction using the data.

4. The system of claim 1, wherein the memory controller is associated with a channel in the memory and the channel in the memory is allocated into two or more pseudo-channels.

5. The system of claim 4, wherein the memory controller is configured to schedule the order of execution by selecting, for each of the two or more pseudo-channels, different types of the plurality of processing-in-memory requests and different types of the non-processing-in-memory requests using a first arbiter.

6. The system of claim 5, wherein the first arbiter selects, for each of the two or more pseudo-channels, one hit request, one miss request, and one conflict request from the plurality of processing-in-memory requests.

7. The system of claim 5, wherein the first arbiter selects, for each of the two or more pseudo-channels, one hit request, one miss request, and one conflict request from the plurality of non-processing-in-memory requests.

8. The system of claim 5, wherein the memory controller is configured to schedule the order of execution by selecting, using a second arbiter and for each of the two or more pseudo-channels, one request from the different types of the plurality of processing-in-memory requests and the different types of the non-processing-in-memory requests that were selected by the first arbiter.

9. The system of claim 8, wherein the second arbiter is configured to select the one request for each of the two or more pseudo-channels based on priority information associated with each of the different types of the plurality of processing-in-memory requests and the different types of the non-processing-in-memory requests that were selected by the first arbiter.

10. The system of claim 8, wherein the second arbiter is configured to select the one request for each of the two or more pseudo-channels based on a time at which each of the different types of the plurality of processing-in-memory requests and the different types of the non-processing-in-memory requests that were selected by the first arbiter is stalled at the memory controller.

11. The system of claim 8, wherein the second arbiter is configured to select the one request for each of the two or more pseudo-channels based on an estimated cost of:
switching the system from executing processing-in-memory requests to executing non-processing-in-memory requests; or
switching the system from executing non-processing-in-memory requests to executing processing-in-memory requests.

12. The system of claim 8, wherein the memory controller is configured to schedule the order of execution using a third arbiter that defines an ordering of requests selected by the second arbiter.

13. The system of claim 1, wherein the memory controller is further configured to predict, while the system is executing processing-in-memory requests, a first cycle for switching to executing non-processing-in-memory requests based on historical data describing a number of hits per row and a measured number of open rows in the memory while the system was previously executing non-processing-in-memory requests.

14. The system of claim 13, wherein the memory controller is further configured to predict, while the system is executing non-processing-in-memory requests, a second cycle for switching to executing processing-in-memory requests based on historical data describing a measured number of hits per row in the memory while the system was previously executing processing-in-memory requests.

15. The system of claim 14, wherein the memory controller is further configured to:
switch the system from executing processing-in-memory requests to executing non-processing-in-memory request at the first cycle; and
switch the system from executing non-processing-in-memory requests to executing processing-in-memory requests at the second cycle.

16. The system of claim 15, wherein the memory controller is further configured to compute a difference between a time at which a first request executed after the system switching was stalled at the memory controller and a corresponding one of the processing-in-memory request stall threshold or the non-processing-in-memory request stall threshold.

17. The system of claim 16, wherein the first request executed after the system switching is a processing-in-memory request and modifying the processing-in-memory request stall threshold and the non-processing-in-memory request stall threshold comprises:
generating a modified processing-in-memory request stall threshold by adding the difference to the processing-in-memory request stall threshold; and
generating a modified non-processing-in-memory request stall threshold by subtracting the difference from the non-processing-in-memory request stall threshold.

18. The system of claim 16, wherein the first request executed after the system switching is a non-processing-in-memory request and modifying the processing-in-memory request stall threshold and the non-processing-in-memory request stall threshold comprises:
  generating a modified processing-in-memory request stall threshold by subtracting the difference from the processing-in-memory request stall threshold; and
  generating a modified non-processing-in-memory request stall threshold by adding the difference to the non-processing-in-memory request stall threshold.

19. A method comprising:
switching, by a memory controller of a system, operation of the system from executing non-processing-in-memory requests to executing processing-in-memory requests; and
modifying, by the memory controller, a processing-in-memory request stall threshold for the system and a non-processing-in-memory request stall threshold for the system in response to the switching by:
  computing a difference between the processing-in-memory request stall threshold and a time at which a first processing-in-memory request executed after the switching was stalled at the memory controller;
  generating a modified processing-in-memory request stall threshold by adding the difference to the processing-in-memory request stall threshold; and
  generating a modified non-processing-in-memory request stall threshold by subtracting the difference from the non-processing-in-memory request stall threshold.

20. A method comprising:
switching, by a memory controller of a system, operation of the system from executing processing-in-memory requests to executing non-processing-in-memory requests; and
modifying, by the memory controller, a processing-in-memory request stall threshold for the system and a non-processing-in-memory request stall threshold for the system in response to the switching by:
  computing a difference between the non-processing-in-memory request stall threshold and a time at which a first non-processing-in-memory request executed after the switching was stalled at the memory controller;
  generating a modified non-processing-in-memory request stall threshold by adding the difference to the non-processing-in-memory request stall threshold; and
  generating a modified processing-in-memory request stall threshold by subtracting the difference from the processing-in-memory request stall threshold.

* * * * *